United States Patent
Koyama et al.

(10) Patent No.: US 11,176,707 B2
(45) Date of Patent: Nov. 16, 2021

(54) CALIBRATION APPARATUS AND CALIBRATION METHOD

(71) Applicant: Panasonic Intellectual Property Management Co., Ltd., Osaka (JP)

(72) Inventors: Tatsuya Koyama, Kyoto (JP); Masaki Fukuda, Osaka (JP); Toshiyasu Sugio, Osaka (JP); Toru Matsunobu, Osaka (JP); Satoshi Yoshikawa, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/070,290

(22) Filed: Oct. 14, 2020

(65) Prior Publication Data
US 2021/0027496 A1 Jan. 28, 2021

Related U.S. Application Data

(63) Continuation of application No. PCT/JP2019/020393, filed on May 23, 2019.

(30) Foreign Application Priority Data

May 23, 2018 (JP) .............................. JP2018-098902

(51) Int. Cl.
*G06T 7/80* (2017.01)
*G06T 7/246* (2017.01)
(Continued)

(52) U.S. Cl.
CPC ................ *G06T 7/80* (2017.01); *G06T 7/246* (2017.01); *G06T 7/73* (2017.01); *H04N 13/246* (2018.05); *G06T 2207/10016* (2013.01)

(58) Field of Classification Search
CPC .... G06T 7/80; G06T 7/46; G06T 7/73; G06T 2207/10016; H04N 13/246
See application file for complete search history.

(56) References Cited

U.S. PATENT DOCUMENTS 8,897,543 B1\* 11/2014 Lin .......................... G06T 7/593
382/154
9,336,595 B2\* 5/2016 Nakai ....................... G06T 7/80
(Continued)

FOREIGN PATENT DOCUMENTS

JP 2015-22510 2/2015

OTHER PUBLICATIONS

International Search Report (ISR) dated Aug. 13, 2019 in International (PCT) Application No. PCT/JP2019/020393.

*Primary Examiner* — Brian P Yenke
(74) *Attorney, Agent, or Firm* — Wenderoth, Lind & Ponack, L.L.P.

(57) ABSTRACT

A calibration apparatus calibrates parameters of imaging apparatuses which are disposed at different positions and image a common three-dimensional space. The calibration apparatus includes: an obtaining circuit which obtains videos captured by the imaging apparatuses and each including frames; an extraction circuit which extracts feature points from the frames included in the videos, the feature points including first feature points extracted from first frames included in the videos and second feature points extracted from areas containing an image of a moving object in second frames included in the videos and different from the first frames; a matching circuit which performs matching using the feature points, the matching including matching between the first feature points and matching between the second feature points; and a calibration circuit which calculates parameters of the imaging apparatuses based on first match- (Continued)

ing results obtained through the matching by the matching circuit.

9 Claims, 27 Drawing Sheets

(51) Int. Cl.
*G06T 7/73* (2017.01)
*H04N 13/246* (2018.01)

(56) References Cited

U.S. PATENT DOCUMENTS

| | | | |
|---|---|---|---|
| 9,384,551 B2* | 7/2016 | Ramaswamy | G06T 7/85 |
| 9,485,426 B2* | 11/2016 | Sakamoto | H04N 5/247 |
| 10,083,513 B2* | 9/2018 | Tsubota | H04N 13/246 |
| 10,249,058 B2* | 4/2019 | Tsubota | G01C 11/06 |
| 10,277,832 B2* | 4/2019 | Matsunobu | H04N 5/247 |
| 10,347,009 B1* | 7/2019 | Terven | G06T 7/73 |
| 10,445,898 B2* | 10/2019 | Liu | G06T 7/80 |
| 10,750,080 B2* | 8/2020 | Shimauchi | H04N 5/23206 |
| 10,778,951 B2* | 9/2020 | Yoshikawa | G06T 15/20 |
| 10,783,661 B2* | 9/2020 | Jiang | G06T 7/579 |
| 10,789,765 B2* | 9/2020 | Matsunobu | G06T 1/00 |
| 10,805,535 B2* | 10/2020 | Dal Mutto | G06T 7/85 |
| 10,825,158 B2* | 11/2020 | Tanaka | G06T 5/50 |
| 10,827,116 B1* | 11/2020 | Terven | G06T 7/85 |
| 10,924,670 B2* | 2/2021 | Liu | H04N 5/2256 |
| 10,944,955 B2* | 3/2021 | Koyama | G06T 7/70 |
| 11,050,998 B2* | 6/2021 | Lee | G06T 7/55 |
| 2006/0125920 A1* | 6/2006 | Criminisi | G06T 7/593 |
| | | | 348/159 |
| 2006/0222238 A1* | 10/2006 | Nishiyama | G06T 7/285 |
| | | | 382/154 |
| 2014/0125771 A1* | 5/2014 | Grossmann | G06T 5/006 |
| | | | 348/47 |
| 2014/0168367 A1* | 6/2014 | Kang | G06T 7/85 |
| | | | 348/46 |
| 2016/0088287 A1* | 3/2016 | Sadi | H04N 13/261 |
| | | | 348/43 |
| 2017/0221210 A1* | 8/2017 | Martinello | H04N 13/282 |
| 2018/0091704 A1* | 3/2018 | Koyama | H04N 5/0733 |
| 2018/0194007 A1* | 7/2018 | Namiki | B25J 19/04 |
| 2019/0028693 A1* | 1/2019 | Yu | H04N 19/124 |
| 2019/0043220 A1* | 2/2019 | Kumar | G06T 7/174 |
| 2019/0191146 A1* | 6/2019 | Koyama | G06T 7/20 |
| 2019/0325608 A1* | 10/2019 | Taya | G06T 7/70 |
| 2020/0005489 A1* | 1/2020 | Kroeger | G06K 9/4604 |
| 2020/0027242 A1* | 1/2020 | Koyama | B64C 39/024 |
| 2020/0034989 A1* | 1/2020 | Koyama | G05D 1/0094 |
| 2020/0250885 A1* | 8/2020 | Bian | G06T 7/55 |
| 2020/0258257 A1* | 8/2020 | Shimoyama | G01B 11/00 |
| 2020/0282929 A1* | 9/2020 | Kroeger | G01S 7/4021 |
| 2021/0029345 A1* | 1/2021 | Matsunobu | H04N 13/239 |
| 2021/0044787 A1* | 2/2021 | Matsunobu | H04N 21/6587 |
| 2021/0082149 A1* | 3/2021 | Sheorey | H04N 13/20 |

* cited by examiner (a) TIME t1

(b)

| POINTS | CAMERA 10A<br>TWO-DIMENSIONAL<br>COORDINATES | CAMERA 10B<br>TWO-DIMENSIONAL<br>COORDINATES | ...<br>TWO-DIMENSIONAL<br>COORDINATES |
|---|---|---|---|
| P1 | P1A (50, 50) | P1B (20, 50) | ... |
| P2 | P2A (100, 100) | P2B (80, 100) | ... |
| P3 | P3A (400, 10) | P3B (300, 20) | ... |

(a) TIME t3

(b)

| POINTS | CAMERA 10A<br>TWO-DIMENSIONAL<br>COORDINATES | CAMERA 10B<br>TWO-DIMENSIONAL<br>COORDINATES | ...<br>TWO-DIMENSIONAL<br>COORDINATES |
|---|---|---|---|
| P1 | P1A (50, 50) | P1B (20, 50) | ... |
| P2 | P2A (100, 100) | P2B (80, 100) | ... |
| P3 | P3A (400, 10) | P3B (300, 20) | ... |
| P4 | P4A (300, 200) | P4B (200, 200) | ... |
| P5 | P5A (400, 200) | P5B (300, 200) | ... |
| P6 | P6A (500, 200) | P5B (400, 200) | ... |

FIG. 14A

| NO. | TIME | CALIBRATION TARGET | REASON |
|---|---|---|---|
| 0021 | 19:25:30 | 10 A | 20: PAN HEAD ROTATED/MOVED |

FIG. 14B

| NO. | TIME | CALIBRATION TARGET | REASON |
|---|---|---|---|
| 0045 | 20:02:05 | All | 100: HALFTIME DETECTED |

CALIBRATION APPARATUS AND CALIBRATION METHOD

CROSS REFERENCE TO RELATED APPLICATIONS

This application is a U.S. continuation application of PCT International Patent Application Number PCT/JP2019/020393 filed on May 23, 2019, claiming the benefit of priority of Japanese Patent Application Number 2018-098902 filed on May 23, 2018, the entire contents of which are hereby incorporated by reference.

BACKGROUND

1. Technical Field

The present disclosure relates to a calibration apparatus and a calibration method.

2. Description of the Related Art

Japanese Unexamined Patent Application Publication No. 2015-022510 describes a technology of reproducing a three-dimensional shape of a subject from videos captured by a plurality of imaging apparatuses. According to Japanese Unexamined Patent Application Publication No. 2015-022510, a free-viewpoint video is generated using the three-dimensional shape.

SUMMARY

A calibration apparatus according to the present disclosure is a calibration apparatus which calibrates parameters of a plurality of imaging apparatuses which are disposed at different positions and image a common three-dimensional space, the calibration apparatus includes: an obtaining circuit which obtains a plurality of videos captured by the plurality of imaging apparatuses and each including a plurality of frames; an extraction circuit which extracts a plurality of feature points from the plurality of frames included in the plurality of videos obtained by the obtaining circuit, the plurality of feature points including a plurality of first feature points extracted from first frames included in the plurality of videos and a plurality of second feature points extracted from areas containing an image of a moving object in second frames included in the plurality of videos, the second frames being different from the first frames; a matching circuit which performs matching using the plurality of feature points extracted by the extraction circuit, the matching including matching between the plurality of first feature points and matching between the plurality of second feature points; and a calibration circuit which calculates parameters of the plurality of imaging apparatuses based on a plurality of first matching results obtained through the matching by the matching circuit.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14A illustrates an example of a data configuration of calibration information according to Embodiment 1;
FIG. 14B illustrates another example of a data configuration of calibration information according to Embodiment 1.

Figure 1:
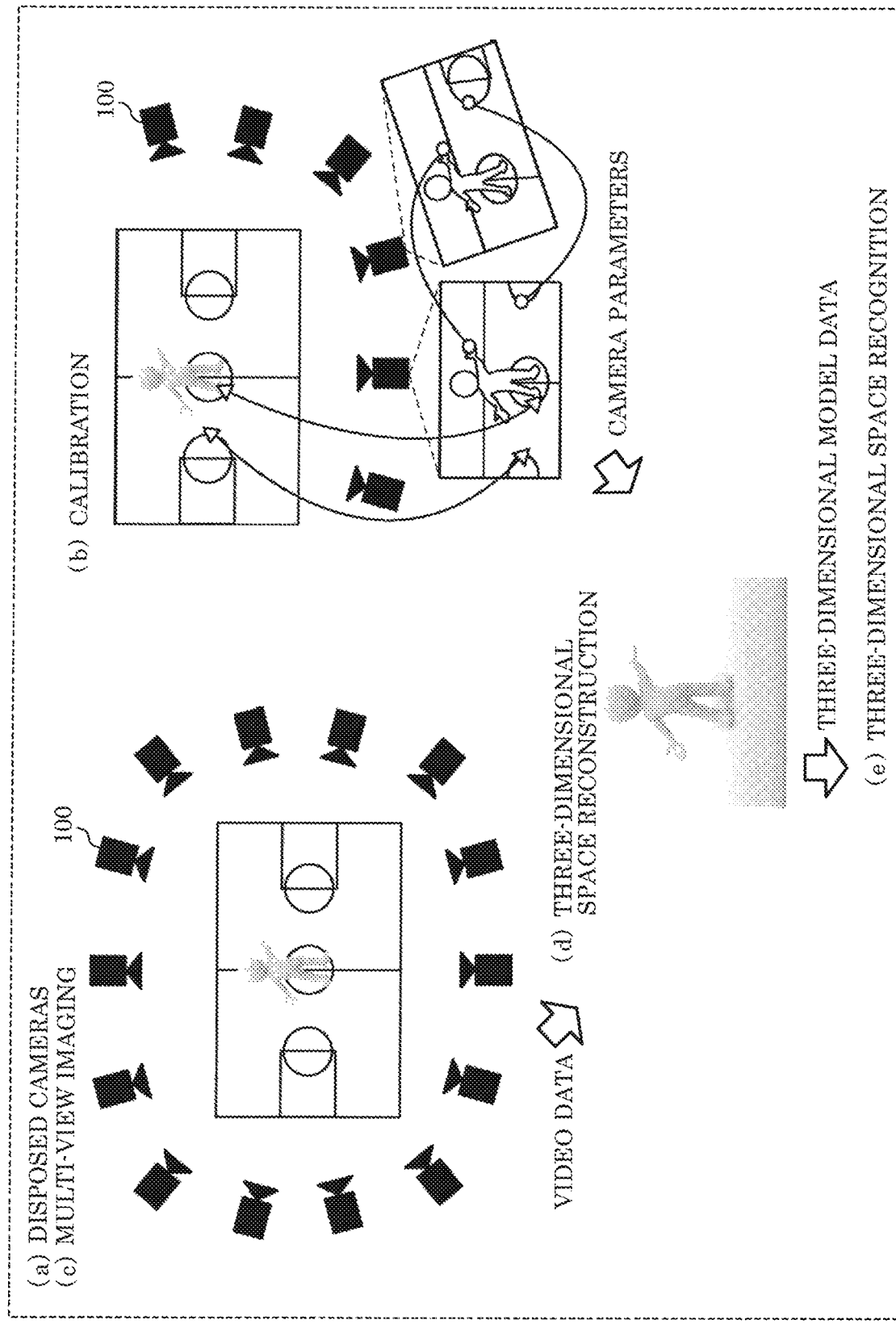
FIG. 1 illustrates an outline of three-dimensional space recognition.

DETAILED DESCRIPTION OF THE EMBODIMENTS (Underlying Knowledge Forming Basis of the Present Disclosure)

A result of three-dimensional space reconstruction by a three-dimensional space reconstruction apparatus that reconstructs (performs modelling of) a three-dimensional shape of a subject is used to generate a free viewpoint video in a three-dimensional space. The three-dimensional space reconstruction apparatus performs such modeling, using video data provided from an imaging system including a plurality of cameras that capture videos of the same scene, and camera parameters obtained through calibration, which indicate, for instance, positions and orientations of the plurality of cameras. Accordingly, if the position of a camera, for instance, is changed after calibration, a camera parameter does not reflect the actual state of, for instance, the position of the camera, and thus a three-dimensional space cannot be appropriately reconstructed. As a result, the quality of a free viewpoint video deteriorates, or even generation of a free viewpoint video fails. For this reason, it is necessary to periodically calibrate parameters of a camera.

In such an imaging system, the plurality of cameras are disposed to surround a predetermined space. For this reason, there is a problem that it is difficult to calibrate parameters with high accuracy in the case where it is difficult to extract feature points when trying to calibrate parameters of the respective cameras.

In this way, the conventional art does not enable easy calibration of parameters of the plurality of imaging apparatuses disposed at positions different from one another.

In view of this, a calibration apparatus according to the present disclosure conceived is a calibration apparatus which calibrates parameters of a plurality of imaging apparatuses which are disposed at different positions and image a common three-dimensional space, the calibration apparatus includes: an obtaining circuit which obtains a plurality of videos captured by the plurality of imaging apparatuses and each including a plurality of frames; an extraction circuit which extracts a plurality of feature points from the plurality of frames included in the plurality of videos obtained by the obtaining circuit, the plurality of feature points including a plurality of first feature points extracted from first frames included in the plurality of videos and a plurality of second feature points extracted from areas containing an image of a moving object in second frames included in the plurality of videos, the second frames being different from the first frames; a matching circuit which performs matching using the plurality of feature points extracted by the extraction circuit, the matching including matching between the plurality of first feature points and matching between the plurality of second feature points; and a calibration circuit which calculates parameters of the plurality of imaging apparatuses based on a plurality of first matching results obtained through the matching by the matching circuit.

With this, the first feature points are extracted from the first frames, and the second feature points are extracted from the areas each containing the image of the moving object in the respective second frames. Thus, it is possible to add and use the feature points of the moving object as the feature points for use in calibration of parameters. In other words, it is possible to effectively increase feature points obtainable from the videos captured by the plurality of imaging apparatuses, and thus it is possible to calibrate the parameters of the imaging apparatuses with high accuracy.

In addition, the extraction circuit may: extract, as the second frames, frames captured at a first timing in the plurality of videos and including the areas containing the image of the moving object; and extract the plurality of second feature points in the second frames extracted from the plurality of videos.

For this reason, since feature points are extracted from the frames captured at the same timing among frames each containing the image of the moving object, the feature points are extracted from the frames captured when the moving object is located at a particular position on the three-dimensional space. For this reason, it is possible to effectively increase the feature points for use in calibration of the parameters of the imaging apparatuses.

In addition, when a total number of first matching results is smaller than a first number, the extraction circuit may extract a plurality of third feature points from areas containing an image of the moving object in third frames included in the plurality of videos. The third frames may be captured at a second timing different from the first timing. The matching circuit may perform matching between the plurality of third feature points extracted by the extraction circuit. The calibration circuit may calculate parameters of the plurality of imaging apparatuses based on a plurality of second matching results including the plurality of first matching results and results of the matching between the plurality of third feature points.

Since it is possible to obtain a sufficient number of matching results, it is possible to calibrate the parameters with high accuracy.

In addition, the extraction circuit and the matching circuit may repeat the extracting and the matching on frames captured at a timing different from a capturing timing of frames on which the extraction has been performed in the plurality of videos, until a total number of second matching results obtained through the matching by the matching circuit reaches or exceeds the first number.

In this way, when a sufficient number of matching results is obtained, no extraction and matching are executed on frames captured at a different timing. Thus, it is possible to reduce processing load.

In addition, in a case where areas obtained by dividing each of the plurality of videos include insufficient areas in each of which a total number of feature points is smaller than a second number among the plurality of feature points associated in the plurality of first matching results, the extraction circuit may extract fourth frames including the insufficient areas containing an image of the moving object in the plurality of videos, and extract a plurality of fourth feature points from the insufficient areas of the fourth frames, the matching circuit may perform matching between the plurality of fourth feature points extracted by the extraction circuit, and the calibration circuit may calculate parameters of the plurality of imaging apparatuses based on a plurality of third matching results including the plurality of first matching results and results of the matching between the plurality of fourth feature points.

Since it is possible to obtain a sufficient number of matching results in each insufficient area, it is possible to calibrate the parameters with high accuracy. Furthermore, since it is only necessary to perform processing in the insufficient area, it is possible to reduce processing load.

In addition, the extraction circuit and the matching circuit may repeat the extracting and the matching on frames captured at a timing different from a capturing timing of frames on which the extraction has been performed in the plurality of videos, until a total number of third matching results obtained through the matching by the matching circuit in the areas reaches or exceeds the second number.

In this way, when a sufficient number of matching results is obtained in the insufficient area, no extraction and matching are executed on frames captured at a different timing. Thus, it is possible to reduce processing load.

In addition, the calibration circuit may further estimate a plurality of three-dimensional positions on the three-dimensional space included in the plurality of first matching results. The calibration apparatus may further include: a determination circuit which determines whether accuracy of the parameters calibrated by the calibration apparatus is sufficient based on the plurality of three-dimensional positions estimated by the calibration circuit. When the determination circuit determines that the accuracy of the parameters is not sufficient, the extraction circuit, the matching circuit, the calibration circuit, and the determination circuit may repeat the extracting, the matching, the calibrating, the estimating, and the determining respectively on frames captured at a timing different from a capturing timing of frames on which the extracting has been performed in the plurality of videos, until the determination circuit determines that the accuracy of the parameters is sufficient.

In this way, since the processing is repeated on other frames when the accuracy is low, it is possible to increase the accuracy of parameters obtainable by calibration.

In addition, the determination circuit may determine whether each of errors is smaller than a predetermined value, the error being an error between (i) one of sets of two-dimensional coordinates in two-dimensional images obtainable when the plurality of imaging apparatuses image three-dimensional positions included in the plurality of three-dimensional positions estimated by the calibration circuit and (ii) a corresponding set of two-dimensional coordinates included in sets of two-dimensional coordinates, the sets of two-dimensional coordinates being a set of two-dimensional coordinates of one of the plurality of first feature points and a set of two-dimensional coordinates of one of the plurality of second feature points, the plurality of first feature points and the plurality of second feature points being obtained from the plurality of videos captured by the plurality of imaging apparatuses. When the determination circuit determines that the error is larger than the predetermined value, the extraction circuit, the matching circuit, the calibration circuit, and the determination circuit may repeat the extracting, the matching, the calibrating, the estimating, and the determining respectively on a plurality of frames captured at a timing different from a capturing timing of frames on which the extracting has been performed in the plurality of videos, until an error between (i) one of the sets of two-dimensional coordinates and (ii) one of the sets of two-dimensional coordinates is determined to be smaller than or equal to the predetermined value by the determination circuit.

For this reason, it is possible to increase the accuracy of parameters obtainable by the calibration.

It is to be noted that these general and specific aspects may be implemented using a system, a method, an integrated circuit, a computer program, a computer-readable recording medium such as a CD-ROM, or any combination of systems, methods, integrated circuits, computer programs, and recording media.

Hereinafter, the following specifically describes an imaging system and a calibration method according to an aspect of the present disclosure, with reference to the drawings.

It is to be noted that the embodiments described below each indicate a specific example of the present disclosure. The numerical values, shapes, materials, constituent elements, the arrangement and connection of the constituent elements, steps, and the processing order of the steps, for instance, described in the following embodiments are mere examples, and thus are not intended to limit the present disclosure. Among the constituent elements in the following embodiments, constituent elements not recited in any of the independent claims defining the broadest inventive concepts are described as optional elements.

Hereinafter, Embodiment 1 is described with reference to FIGS. 1 to 13.

Embodiment 1

[1. Outline of Three-Dimensional Space Recognition]

First, an outline of three-dimensional space recognition in which an imaging system according to the present embodiment is used is to be described with reference to FIG. 1.

The imaging system includes a plurality of cameras to image the same scene in a predetermined space. A specific example of the predetermined space is a venue where a sporting event is held, and a specific example of the same scene is a scene of a match held in the venue. As another example, the predetermined space is a space that is monitored by monitoring cameras, and the same scene includes, for example, the state of a person or an object present in the space being monitored. As another example, the predetermined space is a space on a road on which a vehicle is running.

The cameras capture videos of areas that at least partially overlap one another in the space, from positions different from one another. For example, as illustrated in (a) of FIG. 1, a plurality of cameras 100 surround a space that is a venue of a sport match and are disposed in positions different from one another. Cameras 100 are in orientations different from one another, so that imaging areas of cameras 100 each cover at least a portion of the space. The imaging areas of cameras 100 are caused to at least partially overlap one another because virtual reconstruction of a three-dimensional space (the three-dimensional space reconstruction) uses video data that are generated by imaging the same subject from a plurality of viewpoints.

It is to be noted that causing the imaging areas to overlap one another may not involve an imaging area of one camera 100 overlapping imaging areas of all other cameras 100, and thus the imaging area may overlap an imaging area of at least another one of cameras 100.

Cameras 100 disposed in such a manner are communicatively connected to a later-described control apparatus included in the imaging system.

If cameras 100 are disposed, calibration is performed.

Calibration is to calculate parameters that indicate a position and an angle of an imaging direction (orientation) of each camera 100 by associating an actual point in an imaging area of each camera 100 and a point in a video (association between points illustrated by white triangles that are connected by curves in (b) of FIG. 1) or by associating points in videos captured by different cameras 100 (association between points illustrated by white circles that are connected by curves in (b)). Parameters that indicate a position and an orientation of camera 100 are represented in a common coordinate system in a predetermined space that is a three-dimensional space, and are camera parameters that are later used in three-dimensional space reconstruction. The camera parameters will be described later.

Calculating the camera parameters and making the camera parameters known are preparation for performing three-dimensional space recognition, and are performed before start of the three-dimensional space recognition. The calculated camera parameters are transmitted to a later-described three-dimensional space reconstruction apparatus that performs three-dimensional space reconstruction.

After such preparation, cameras 100 perform multi-view imaging by capturing synchronized videos based on signals from the control apparatus ((c) of FIG. 1). Video data generated by the multi-view imaging is transmitted to the three-dimensional space reconstruction apparatus.

In the three-dimensional space reconstruction performed by the three-dimensional space reconstruction apparatus, the video data and the camera parameters are used to generate three-dimensional model data of the subject in the imaging areas ((d) of FIG. 1). The three-dimensional model data is transmitted to the later-described three-dimensional space recognition apparatus that performs three-dimensional space recognition.

Examples of the functions provided by the three-dimensional space recognition that the three-dimensional space recognition apparatus performs using the three-dimensional model data ((e) of FIG. 1) include the above-described generation of a free-viewpoint video, scene analysis, and tracking.

A simple example of a method of generating a free-viewpoint video is to be described. First, a structure of each subject in an imaging area viewed from a virtual viewpoint that is specified by a user or a system administrator or is set automatically, and a distance between the viewpoint and the subject are calculated based on the three-dimensional model data. Next, information on a color and texture of each subject is obtained preferentially from video data captured by camera 100 that is closer to the virtual viewpoint than any other cameras 100. Finally, the information on a color and texture, the calculated structures of subjects, and the calculated distances to the subjects are used to generate (render) a video that is viewed from the virtual viewpoint. The rendered video is distributed to a video display terminal of the user.

Such a function of generating a free-viewpoint video can be used in a field of entertainment, such as a sport program on television. This allows, for example, a viewer to play a video of a scene highlight from a viewpoint requested by the viewer. The function of generating a free-viewpoint video may be used in the monitoring system. In this case, it is possible to present, to a security guard, an estimated appearance of a suspicious person viewed from a viewpoint from which images are not captured by an actual camera, so that the security guard can keep a lookout for the suspicious person.

It is also possible in the scene analysis and the tracking to calculate a structure of each subject in an imaging area seen from a virtual viewpoint and a distance between the subject and the virtual viewpoint based on the three-dimensional model data, as in the generation of a free-viewpoint video, and to use information on a color and a texture of the subject that is acquired preferentially from camera 100 that is closer to the virtual viewpoint than any other cameras 100.

The scene analysis is performed by analyzing a video showing the state of each subject in an imaging area such as a person or an object at a moment, by using software or by a person watching the video on a screen. By performing the scene analysis based on three-dimensional model data, it is possible to observe a three-dimensional orientation of a person in an imaging area or a three-dimensional shape of an object in an imaging area, which allows more accurate circumstance recognition and prediction than those performed using two-dimensional videos.

In the tracking, for example, a subject in an imaging area is identified by analyzing scenes in videos captured by cameras 100. In addition, the same subjects among identified subjects in videos that are captured by cameras 100 at a moment are associated with one another by software or manually. Subjects are identified and associated in such a manner along a time axis, thus carrying out tracking. There is, however, a case where a subject of interest in two-dimensional videos captured by cameras 100 cannot be continuously identified because the subject is temporarily hidden behind another subject. Also in such a case, if three-dimensional model data is used, each subject can be continuously identified using three-dimensional position information or three-dimensional shape information of the subject.

Such functions of the scene analysis and the tracking can be used, for example, in the next-generation monitoring system described above. This is expected to achieve early detection of a suspicious scene and an increase in the accuracy of the detection. In addition, this achieves tighter security than the security achieved by a conventional technique even in a location where a limited number of cameras can be disposed.

All of the functions for the three-dimensional space recognition such as the generation of a free-viewpoint video, the scene analysis, and the tracking are assumed to be used as both after-the-fact use and real-time use. Each of the functions may be selected according to intended use, and implemented in a system that includes a computer having performance appropriate to the selection, particularly performance that relates to video processing.

As seen from the above, three-dimensional video data based on the three-dimensional model data is used for all of the functions of the three-dimensional space recognition. This three-dimensional model data is generated by three-dimensional space reconstruction (modeling) based on video data captured by cameras 100 and the camera parameters of cameras 100 calculated through the calibration.

The camera parameters include external parameters that indicate positions and orientations of the cameras in the three-dimensional space, and internal parameters that indicate optical properties of the cameras such as focal distance, aberration, and image center. A correlation between a point (u, v) on a two-dimensional video captured by a camera and a point (x, y, z) in an imaging area, which is a three-dimensional space shown in the two-dimensional video, is derived from the camera parameters. That is, use of camera parameters of a camera allows points on a two-dimensional video captured by the camera to be projected into a captured three-dimensional space. The projection into the three-dimensional space is the above three-dimensional space reconstruction ((d) of FIG. 1).

The camera parameters of cameras 100 above are represented in a common three-dimensional coordinate system that is set in the imaging areas. The camera parameters of cameras 100 are then calculated such that the same location (point) in imaging areas in videos captured by cameras 100 is projected from the videos to the same point in the three-dimensional coordinate system ((b) of FIG. 1).

The camera parameters are necessary to generate three-dimensional model data from video data captured by cameras 100, and accuracy of the camera parameters influences accuracy of the three-dimensional space reconstruction. The term accuracy used herein refers to accuracy of a position of camera 100 in a three-dimensional space indicated by camera parameters, that is, similarity to the actual state of camera 100. If the accuracy of the camera parameters is insufficient, the three-dimensional model data cannot be obtained.

As described with reference to FIG. 1, if the calibration is performed immediately before the imaging, the accuracy of the camera parameters is sufficient immediately after the imaging has started, but in general, the accuracy lowers with time due to shaking that occurs in a place where camera 100 is disposed, operations on camera 100, or the like. The following describes an imaging system that timely causes, even during imaging, camera 100 to perform calibration, whose camera parameters have become less accurate, so as to reduce an adverse influence on three-dimensional space reconstruction due to the deterioration in the accuracy of the camera parameters, intending in turn to stabilize the accuracy and applicability of three-dimensional space recognition.

[2. Configuration of Imaging System]

Figure 2:
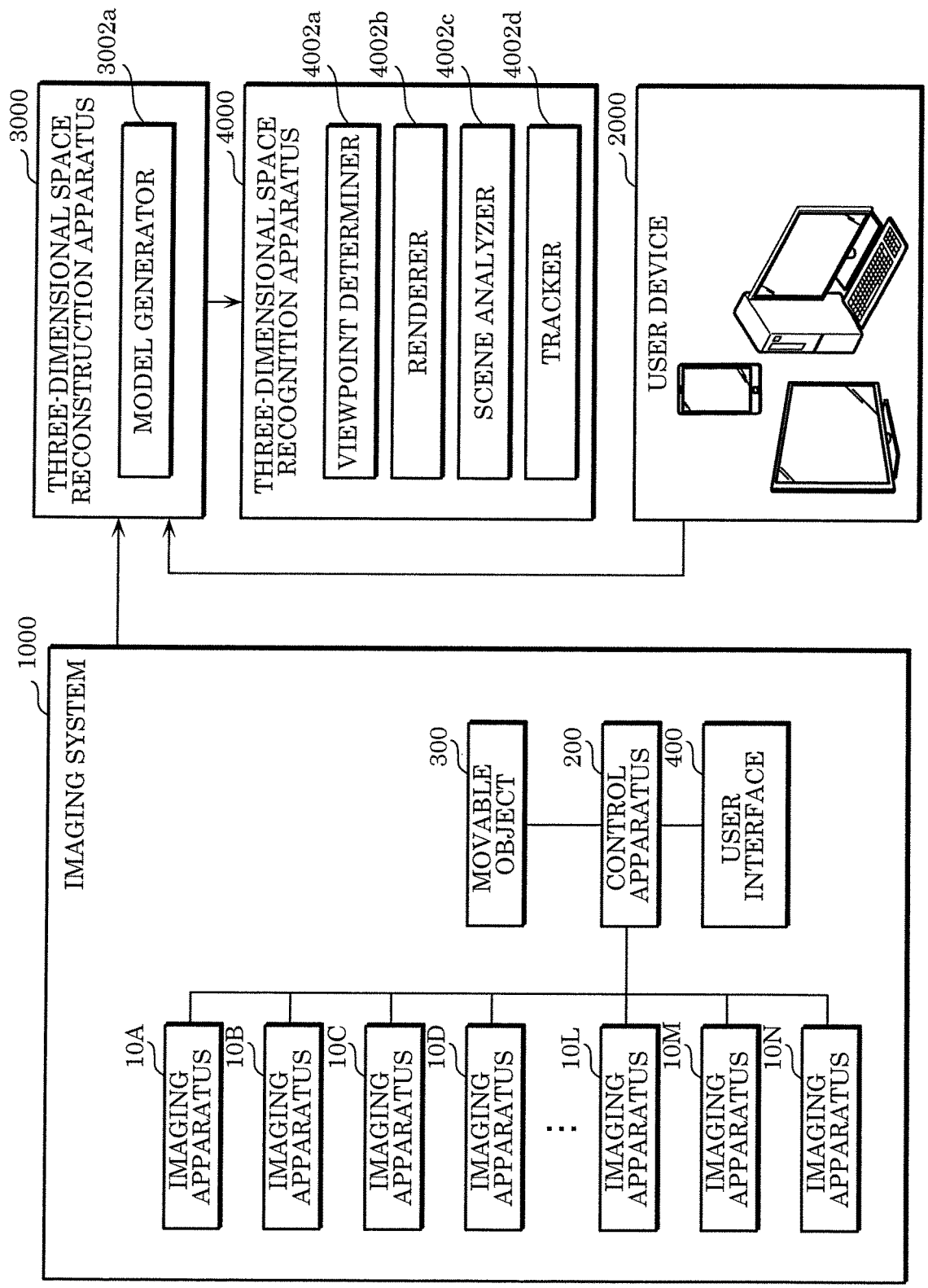
FIG. 2 is a block diagram illustrating a configuration of a multi-view imaging system according to Embodiment 1.

FIG. 2 is a block diagram illustrating a configuration of an imaging apparatus according to Embodiment 1. A three-dimensional space reconstruction apparatus and a three-dimensional space recognition apparatus that use data received from the imaging system, and a user device that receives a free-viewpoint video or the like from the three-dimensional space recognition apparatus and displays the free-viewpoint video are to be also described with reference to FIG. 2.

Imaging system 1000 according to the embodiment includes a plurality of imaging apparatuses 10A to 10N, control apparatus 200, calibration apparatus 300, and user interface circuit 400. Imaging apparatuses 10A to 10N are communicatively connected to control apparatus 200. Calibration apparatus 300 is communicatively connected to control apparatus 200.

[2-1. Configuration of Imaging Apparatus]

Figure 3:
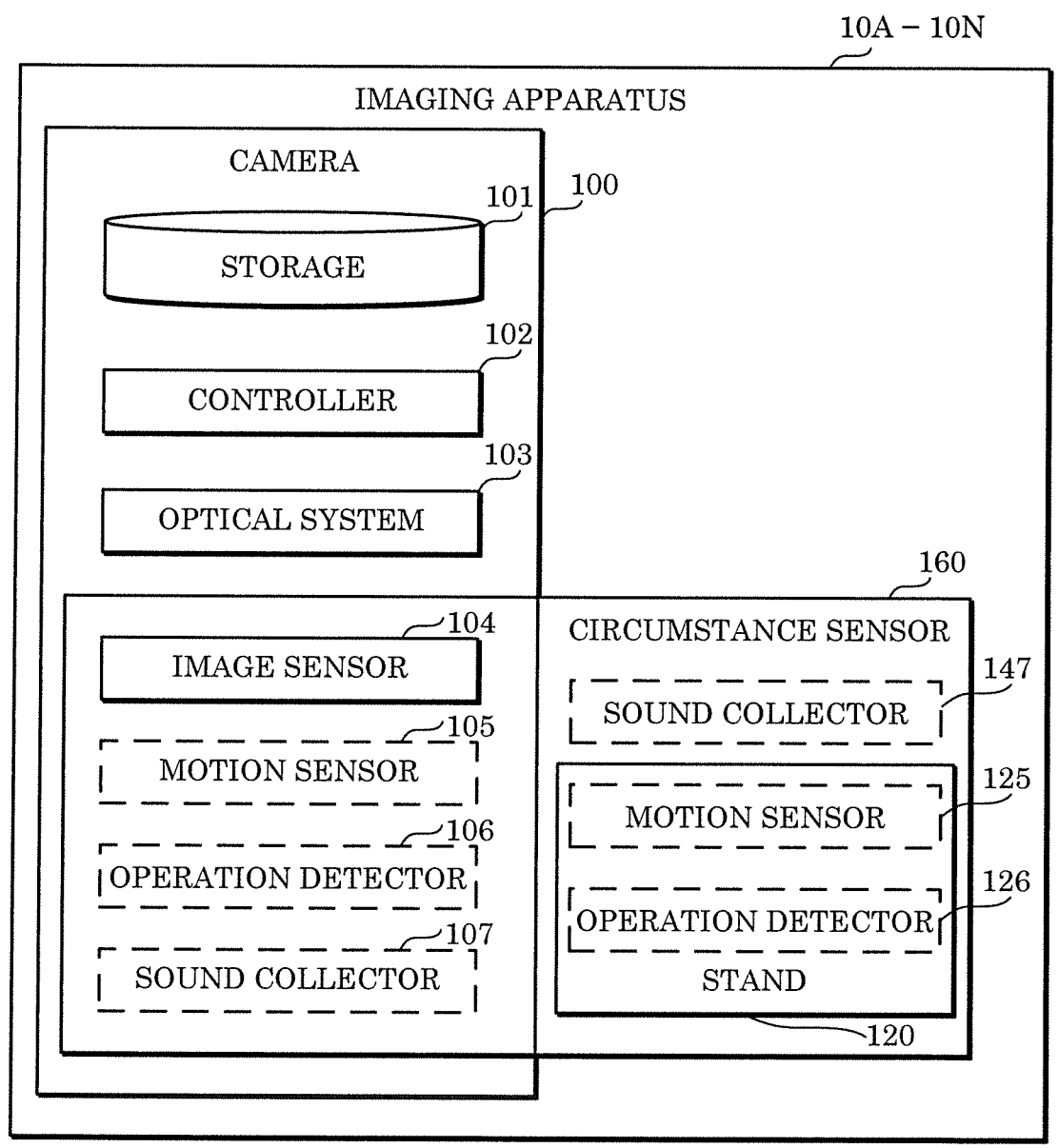
FIG. 3 is a block diagram illustrating a configuration of an imaging apparatus according to Embodiment 1.

FIG. 3 is a block diagram illustrating a configuration of an imaging apparatus according to Embodiment 1.

Imaging apparatuses 10A to 10N are apparatuses each including camera 100 for capturing a predetermined space, which is equivalent to camera 100 illustrated in FIG. 1. Possible configurations of imaging apparatuses 10A to 10N are the same. The term "predetermined space" used herein is a union of imaging areas of the plurality of cameras 100.

Imaging apparatuses 10A to 10N each include camera 100, stand 120, and circumstance sensor 160. Hereinafter, since imaging apparatuses 10A to 10N have the same configuration, description focuses on imaging apparatus 10A when one imaging apparatus according to the present disclosure is to be described. Thus, the following description of imaging apparatus 10A also applies to other imaging apparatuses 10B to 10N.

Camera 100 includes storage 101, controller 102, optical system 103, and image sensor 104.

Storage 101 stores a program that is read and executed by controller 102. Storage 101 temporarily stores video data on an imaging area captured using image sensor 104, meta information such as a time stamp that is to be attached to the video data, information obtained through sensing by circumstance sensor 160 described later, camera parameters of camera 100, and imaging settings such as a frame rate or a resolution that is being applied.

Such storage 101 is implemented by use of a rewritable, nonvolatile semiconductor memory such as a flash memory. In addition, a read-only memory (ROM), which is non-rewritable, or a random access memory (RAM), which is volatile, can be used as storage 101 according to whether data to be stored needs to be overwritten, how long the data has to be stored, or the like.

The number of imaging apparatuses included in imaging system 1000 is not limited as long as more than one imaging apparatus is included. In addition, imaging apparatuses 10 does not always need to have common properties. Imaging apparatuses 10 are not limited to monaural cameras and may include stereo cameras.

Controller 102 is implemented by, for example, use of a central processing unit (CPU) and reads and executes the program stored in storage 101 described above to control elements included in camera 100, thus allowing the imaging function and other functions to be carried out. The other functions include the calculation of camera parameters, that is, the calibration. It is to be noted that controller 102 may be implemented by a dedicated circuit that controls the constituent elements included in camera 100, to allow the imaging function and other functions to be carried out. In other words, controller 102 may be implemented by software or by hardware.

Optical system 103 is an element by which light from the imaging area is formed into an image on image sensor 104, and is implemented by use of optical elements including a lens. Optical system 103 may allow its focal distance and angle of view to be changed. A wide-angle lens or a super-wide-angle lens such as a fisheye lens may be used. For example, when videos captured by imaging system 1000 are used in a monitoring system, wide-angle lenses may be used to expand an imaging area. It is to be noted that properties of optical system 103 such as focal distance, aberration, and image center are used in the three-dimensional space reconstruction as the internal parameters described above. That is, when the focal distance of optical system 103 is changed or a lens of optical system 103 is changed, it is necessary to change the camera parameters used in the three-dimensional space reconstruction as in the case where a position of a camera is changed. Stated differently, the camera parameters need to be calibrated.

Image sensor 104 is implemented by a solid-state image sensor that receives light collected by optical system 103 with its light receiving surface and converts the received light into an electric signal representing an image, such as a CCD image sensor, a CMOS image sensor, and a MOS image sensor. Video data generated by image sensor 104 is transmitted to three-dimensional space reconstruction apparatus 3000 and three-dimensional space recognition apparatus 4000, so as to be used in the three-dimensional space reconstruction and the three-dimensional space recognition.

Camera 100 illustrated in FIG. 3 further includes motion sensor 105, operation detector 106, and sound collector 107. These will be described as constituent elements of circumstance sensor 160 described later.

Stand 120 is an element that fixes and supports camera 100 in a predetermined position while camera 100 is generating video data to be used in the three-dimensional space reconstruction by imaging, and is implemented by, for example, a tripod. It is to be noted that stand 120 may allow a length and an angle of each of one or more legs to be adjusted in order to adjust a fixing position of camera 100 for preparation of the imaging. Stand 120 may include a mechanism to rotate the pan head in order to pan or tilt camera 100, an elevating mechanism to move camera 100 vertically, and the like. Alternatively, stand 120 may include a mechanism to support and move camera 100, such as a dolly and a crane.

Stand 120 illustrated in FIG. 3 further includes motion sensor 125 and operation detector 126. These will be described as constituent elements of circumstance sensor 160 described later.

Circumstance sensor 160 senses at least one of a circumstance about camera 100 (or imaging apparatus 10A) or a circumstance in a predetermined space that includes the imaging area of camera 100 and outputs the sensed circumstance as imaging circumstance information. In other words, circumstance sensor 160 is a sensor that measures an event occurring in at least one of camera 100 and the predetermined space or is a detector that detects the occurrence of the event, and outputs a signal that indicates a result of the measurement or the detection. The output signal is transmitted to control apparatus 200, and is used by control apparatus 200 to determine whether to perform the calibration.

As long as circumstance sensor 160 is a sensor or a detector that can sense the above circumstance, a sensor or a detector included in camera 100 or stand 120, or a sensor or a detector provided separately therefrom may be used as circumstance sensor 160.

For example, image sensor 104 included in camera 100 may be used as circumstance sensor 160. In this case, control apparatus 200 determines whether to perform the calibration, based on video data output from image sensor 104. The determination is made based on, for example, changes over time in a background area that appears in video data, the number of feature points, or changes over time regarding whether a specific subject (e.g., a person, a ball, or an exhibit to be monitored) is present or not.

Camera 100 may include a sensor that perceives displacement, acceleration, vibration, tilt, and geomagnetism or includes a positioning mechanism that can sense a larger parallel translation, such as a global positioning system (GPS) receiver. A sensor (motion sensor 105) that can detect such motions (movements) of camera 100 may be used as circumstance sensor 160.

In addition, camera 100 may include a mechanism for detecting a user manual operation or an operation under control of controller 102 that executes a program, that is, an automatic operation. Examples of the operation to be detected herein include turning on and off a switch, and changing settings of optical system 103 such as focal distance and focus. A sensor (operation detector 106) that can sense such operations of camera 100 may be used as circumstance sensor 160.

Alternatively, stand 120 may include a sensor that perceives displacement, acceleration, vibration, tilt, and geomagnetism or may include a positioning mechanism such as a GPS receiver. Since a motion of camera 100 is in synchronism with a motion of stand 120 on which camera 100 is fixed, it is possible to indirectly sense whether camera 100 is moved, based on whether stand 120 is moved, for example. A sensor (motion sensor 125) that can detect such motions (movements) of camera 100 may be used as circumstance sensor 160.

Stand 120 may include a mechanism for detecting an operation caused by a user operation. An operation detected here is, for example, an operation of rotating or vertically moving the pan head. A sensor (operation detector 126) that can sense such operations on stand 120 may be used as circumstance sensor 160.

Stand 120 makes a mechanical movement due to such an operation, and thus motion sensor 125 and operation detector 126 are distinguished from each other in the configuration illustrated in FIG. 3 for the convenience of description, but may not necessarily be distinguished in practice.

There is a case where camera 100 includes sound collector 107. Alternatively, sound collector 147 that is provided separately from camera 100 may be used to collect sound produced in a scene captured by camera 100. Sound collected by sound collector 107 or 147 may indicate a circumstance about camera 100 or a circumstance in a predetermined space that includes the imaging area of camera 100. Sound can indicate, for example, that camera 100 or stand 120 has received a shock, a sporting event has had a scene highlight, or an intermission starts or ends. Sound collector 107 or 147 to collect such sound may be used as circumstance sensor 160.

As described above, various kinds of sensors can be used as circumstance sensor 160 of imaging system 1000 according to the present embodiment. In FIG. 3, among the elements that can be used as circumstance sensor 160 in the above manner, image sensor 104 always included in camera 100 is illustrated by a solid line, and the other elements are illustrated by broken lines.

Circumstance sensor 160 may not be achieved by both of the sensor included in camera 100 and the sensor included in stand 120, and it suffices that circumstance sensor 160 includes at least one of a sensor or a detector that senses at least one of the circumstance about camera 100 (or imaging apparatus 10A) or the circumstance in the predetermined space that includes the imaging area of camera 100, as exemplified above.

Imaging apparatuses 10B to 10N each include camera 100, stand 120, and circumstance sensor 160, as with imaging apparatus 10A. Possible configurations of imaging apparatuses 10A to 10N are the same as stated above, but the configurations of imaging apparatuses 10A to 10N may not be the same as long as video data generated by imaging and camera parameters are output from cameras 100 of imaging apparatuses 10A to 10N and input from imaging system 1000 to three-dimensional space reconstruction apparatus 3000. One imaging apparatus may include a plurality of cameras 100, and the number of optical systems and the number of image sensors included in camera 100 may not be one. For example, camera 100 may be a stereo camera.

[2-2. Configuration of Control Apparatus]

Figure 4:
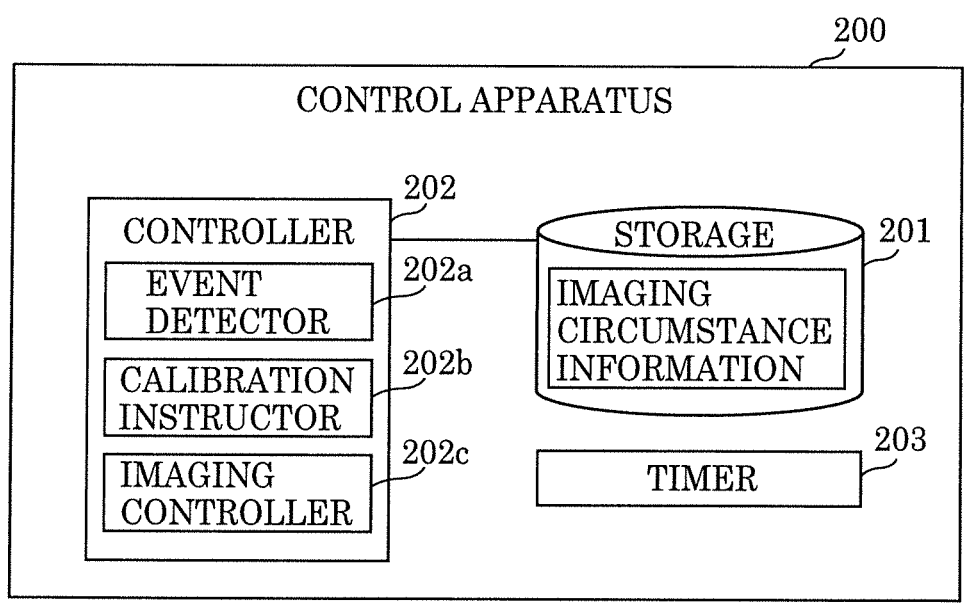
FIG. 4 is a block diagram illustrating a configuration of a control apparatus according to Embodiment 1.

FIG. 4 is a block diagram illustrating a configuration of a control apparatus according to Embodiment 1.

Control apparatus 200 includes storage 201, controller 202, and timer 203.

Control apparatus 200 controls imaging apparatuses 10A to 10N, and processes data received from imaging apparatuses 10A to 10N. Control apparatus 200 uses user interface circuit 400 to present information on the control and the processing of data to a user and to receive input of instructions regarding the control and the processing of data from a user. Control apparatus 200 directs calibration apparatus 300 to perform processing of calibrating camera parameters.

An example of control apparatus 200 is a computer. In this case, storage 201 is a storage apparatus of the computer and is implemented by a hard disk drive, a semiconductor memory of any of various kinds, or a combination thereof. Controller 202 is implemented by a CPU of the computer, and timer 203 is a timer included in the computer and referred to by the CPU. User interface circuit 400 is implemented by a display apparatus, a touch screen, a track pad, a keyboard, a mouse, or other kinds of controllers, which are connected to the computer, or a combination thereof.

Storage 201 stores a program that is read and executed by controller 202. Storage 201 stores data that is received from imaging apparatuses 10A to 10N and to be processed by controller 202. The imaging circumstance information illustrated in FIG. 4 is an example of such data.

Controller 202 reads and executes a program that is stored in storage 201 described above, so as to control imaging apparatuses 10A to 10N and calibration apparatus 300 described above. Further, controller 202 performs a process for presenting, to a user, information on the control and the processing, and a process in response to an instruction from a user. One of the processes is the control of capturing synchronized videos by cameras 100 included in imaging apparatuses 10A to 10N.

In addition, event detection and a calibration instruction may be included each as one of the processes. Event detector 202a included in controller 202 is a functional constituent element that is implemented by controller 202 executing a program for event detection. Calibration instructor 202b included in controller 202 is a constituent element that is implemented by controller 202 executing a program for the calibration instruction.

It is to be noted that event detector 202a, calibration instructor 202b, and imaging controller 202c of controller 202 may be implemented by dedicated circuits that allow, for instance, event detection, a calibration instruction, movement control, imaging control, and calibration processing to be carried out. In other words, controller 202 may be implemented by software or by hardware.

Event detector 202a detects occurrence of a predetermined event that can be a reason for performing the calibration on one of cameras 100 included in imaging apparatuses 10A to 10N, based on the imaging circumstance information that is provided from imaging apparatuses 10A to 10N. An event that can be a reason for performing the calibration is an event that causes camera 100 to move or is highly likely to cause camera 100 to move, or an event that is highly likely to allow the calibration to be performed with high accuracy. More specific examples will be described later in description of operation of imaging system 1000. If the occurrence of such an event is detected, event detector 202a determines whether to perform the calibration. If it is determined to perform the calibration, event detector 202a outputs calibration information that indicates the calibration to be performed to calibration instructor 202b, for example. Alternatively, the calibration information may be output to the display apparatus included in user interface circuit 400 to be presented to a user. The calibration information contains, for example, camera 100 that is to perform the calibration (or one of imaging apparatuses 10A to 10N that includes the camera) and details of the event that is the reason for performing the calibration.

Calibration instructor 202b causes camera 100 indicated by the calibration information to perform the calibration, based on the calibration information received from event detector 202a. If the number of cameras indicated by the calibration information is two or more, the order in which cameras 100 perform the calibration may be determined based on, for example, details of the event that is indicated by the calibration information and is the reason for performing the calibration. A specific example of processing performed by calibration instructor 202b is to be described later.

Imaging controller 202c causes each of the plurality of imaging apparatuses 10A to 10N to image imaging area A1 at different timings. Imaging controller 202c causes the plurality of imaging apparatuses 10A to 10N to image imaging area A1 in a state where the plurality of imaging apparatuses 10A to 10N are disposed at predetermined positions and have attitudes oriented to predetermined directions.

[2-3. Configuration of Calibration Apparatus]

Figure 5:
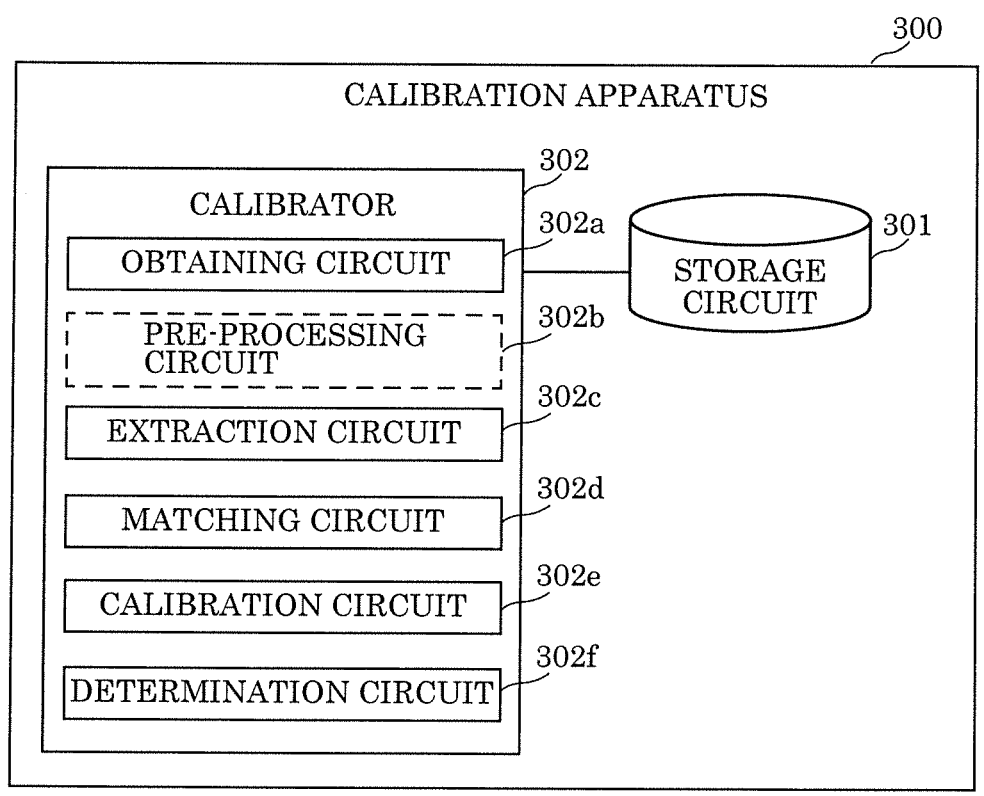
FIG. 5 is a block diagram illustrating a configuration of a calibration apparatus according to Embodiment 1.

FIG. 5 is a block diagram illustrating a configuration of a calibration apparatus according to Embodiment 1.

Calibration apparatus 300 includes storage circuit 301 and calibrator 302.

Calibration apparatus 300 performs processing on data received via control apparatus 200. More specifically, calibration apparatus 300 executes calibration processing on camera parameters. In addition, calibration apparatus 300 may execute three-dimensional space calibration processing.

An example of calibration apparatus 300 is a computer. In this case, storage circuit 301 is a storage apparatus of the computer and is implemented by a hard disk drive, a semiconductor memory of any of various kinds, or a combination thereof. In addition, calibrator 302 is implemented as a CPU of the computer. It is to be noted that calibration apparatus 300 may be implemented by the same computer as control apparatus 200.

Storage circuit 301 stores a program that is read and executed by calibrator 302. Storage circuit 301 stores data that is received from imaging apparatuses 10A to 10N via control apparatus 200 and to be processed by calibrator 302. In other words, imaging circumstance information may be stored.

Calibrator 302 reads and executes a program that is stored in storage circuit 301 described above, so as to perform processing on the data received from imaging apparatuses 10A to 10N described above. Furthermore, calibrator 302 executes processing of presenting, to a user, information on the control and the processing, and processing in response to an instruction from a user. One of examples of the processing includes a process of calibrating camera parameters of cameras 100 included in the plurality of imaging apparatuses 10A to 10N.

Here, the calibration process performed by calibration apparatus 300 is to be described with reference to FIGS. 6 to 12. FIGS. 6 to 12 are each a diagram for explaining details of calibration processing. Although the calibration processing performed on videos 20 and 30 obtained from two imaging apparatuses 10A and 10B among the plurality of imaging apparatuses 10A to 10N has been described for convenience with reference to FIGS. 8 to 12, it is to be noted that similar processing is performed also on videos 40 and 50 obtained from the other ones of the plurality of imaging apparatus 10C to 10N.

Calibrator 302 includes obtaining circuit 302a, pre-processing circuit 302b, extraction circuit 302c, matching circuit 302d, calibration circuit 302e, and determination circuit 302f.

Figure 6:
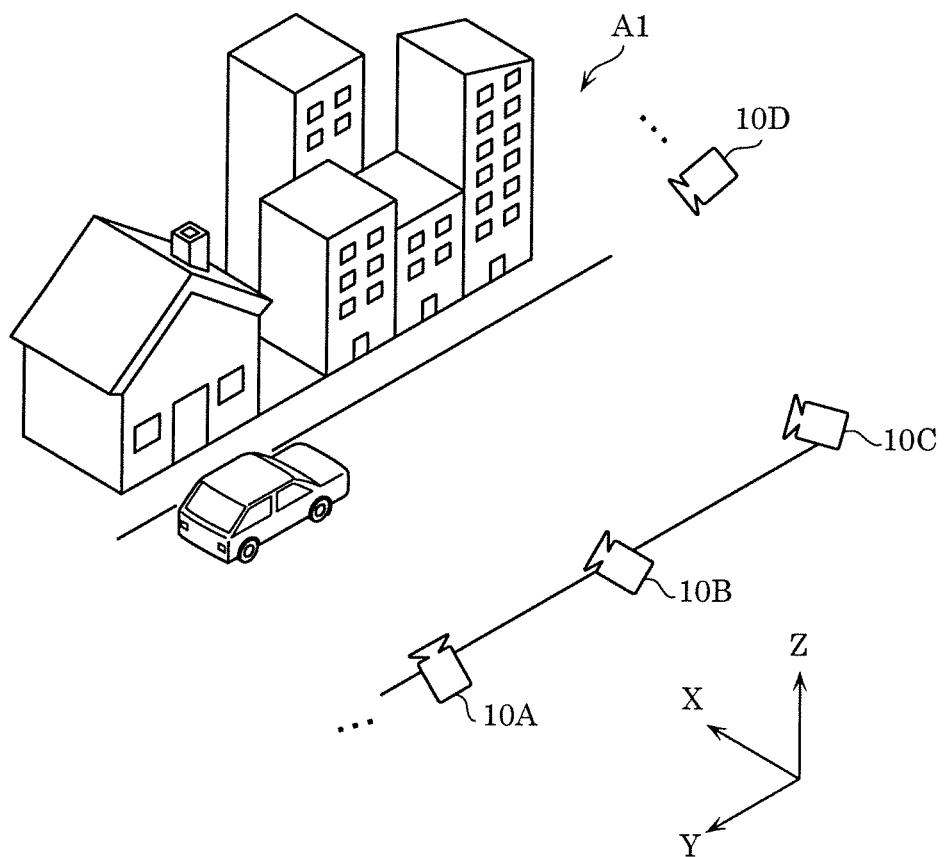
FIG. 6 is a block diagram for explaining details of calibration processing.
Figure 7:
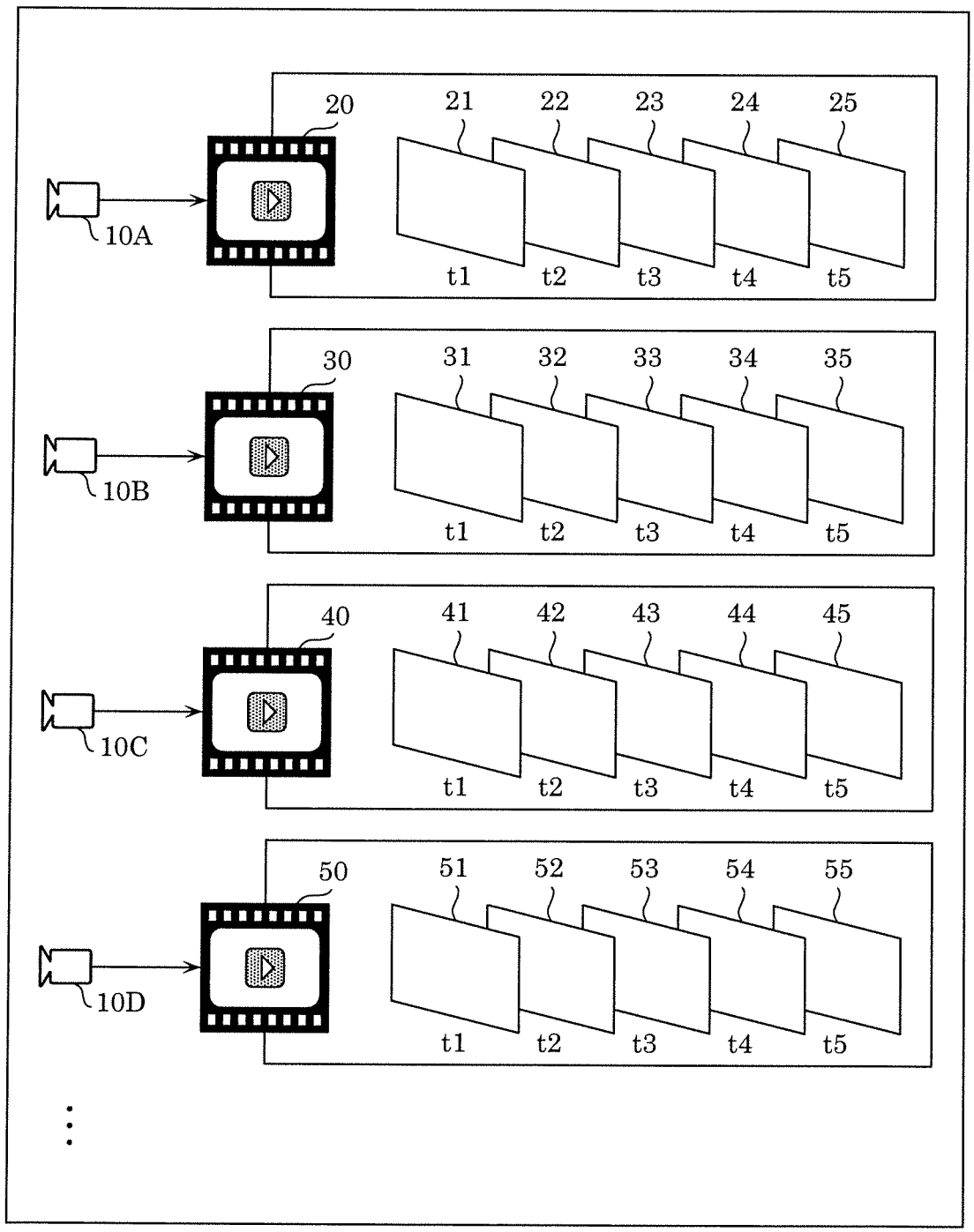
FIG. 7 is a diagram for explaining details of calibration processing.

Obtaining circuit 302a obtains a plurality of videos captured by the plurality of imaging apparatus 10A to 10N. As illustrated in FIG. 6, videos 20, 30, 40, 50, . . . obtained by imaging apparatuses 10A to 10N include frames 21 to 25, frames 31 to 35, frames 41 to 45, and frames 51 to 55, . . . , respectively. Each of videos 20, 30, 40, 50, . . . may be a video or may be configured with a plurality of still images captured at different timings. It is to be noted that tn (n denotes an integer in a range from 1 to 5) below each of frames 21 to 25, 31 to 35, 41 to 45, and 51 to 55 indicates that the frame has been captured at the timing corresponding to time tn. Videos 20, 30, 40, 50, . . . obtained by obtaining circuit 302a are stored in storage circuit 301.

It is to be noted that obtaining circuit 302a may obtain frames 21 to 25, 31 to 35, 41 to 45, 51 to 55, . . . instead of videos 20, 30, 40, 50, . . . from control apparatus 200. In this way, it is possible to start calibration processing immediately after one of the imaging apparatuses captures a frame at a time without waiting time for capturing a video of a certain period of time. In addition, obtaining circuit 302a may store, in storage circuit 301, videos 20, 30, 40, 50, . . . or frames 21 to 25, 31 to 35, 41 to 45, 51 to 55, . . . in advance for receiving a calibration instruction. In this way, calibration processing can be started when calibration is determined to be required.

It is to be noted that the frames captured at a predetermined timing may be identified using time information, names, image information, or sound information assigned to videos 20, 30, 40, 50, . . . or frames 21 to 25, 31 to 35, 41 to 45, 51 to 55, . . . . In addition, when imaging apparatuses 10A to 10N are synchronously imaging frames, the frames may be identified using index information of the frames for videos 20, 30, 40, 50, . . . .

Pre-processing circuit 302b executes pre-processing. The pre-processing is, for example, one of or a combination of brightness adjustment, noise removal, resolution conversion, color space conversion, lens distortion correction, projective transformation, affine transform, edge enhancement processing, and trimming processing. It is only necessary for pre-processing circuit 302b to execute pre-processing on videos obtained by obtaining circuit 302a. Thus, the pre-processing may be executed at a timing different from the timing at which calibration processing is executed, and may be executed prior to the timing at which the calibration processing is executed. It is to be noted that the pre-processing does not always need to be executed by pre-processing circuit 302b. For this reason, calibrator 302 may have a configuration without pre-processing circuit 302b. The pre-processed videos obtained by being subjected to the pre-processing by pre-processing circuit 302b may be stored in storage circuit 301.

Extraction circuit 302c extracts a first feature point from a first frame in each of the pre-processed videos. In addition, extraction circuit 302c extracts, for each of the pre-processed videos, a second feature point from an area containing an image of a moving object in a second frame different from the first frame in the video.

For example, extraction circuit 302c extracts first feature points from frames 21, 31, 41, 51, . . . of the videos captured at the timing corresponding to time t1 in videos 20, 30, 40, 50, . . . , respectively, in FIG. 6. For example, extraction circuit 302c extracts feature points P1A, P2A, and P3A from frame 21, and feature points P1B, P2B, and P3B from frame 31. Here, each of frames 21, 31, 41, and 51 is an example of the first frame. It is to be noted that each of the frames captured at the timing corresponding to time t1 is a frame captured at a timing within a period having a width of several tens of milli-seconds with respect to time t1.

For example, extraction circuit 302c extracts second feature points from frames 22, 32, 42, 52, . . . of the videos captured at the timing corresponding to time t2 in videos 20, 30, 40, 50, . . . , respectively. Here, each of frames 22, 32, 42, and 52 is an example of the second frames. The timing corresponding to time t2 is one example of a first timing. For example, as illustrated in (a) of FIG. 9, extraction circuit 302c extracts feature points P4A and P5A from area A101 containing an image of a moving object in frame 22, and extracts feature points P4B and P5B from area A102 containing an image of the moving object in frame 32. Here, the moving object is, for example, a vehicle.

For example, extraction circuit 302c may extract third feature points from frames 23, 33, 43, 53, . . . captured at the timing corresponding to time t3 in videos 20, 30, 40, 50, . . . , respectively. Here, each of frames 23, 33, 43, and 53 is an example of the third frames. The timing corresponding to time t3 is one example of a second timing. For example, as illustrated in (a) of FIG. 10, extraction circuit 302c extracts feature point P6A from area A111 containing an image of a moving object in frame 23, and extracts feature point P6B from area A112 containing an image of the moving object in frame 33.

Extraction circuit 302c does not always need to select frames captured at the same timing corresponding to the same time in videos 20, 30, 40, 50, . . . , as target frames from which first feature points are to be extracted, and it is only necessary for extraction circuit 302c to extract feature points from frames in the respective videos. In this case, it is only necessary for extraction circuit 302c to extract the feature point from an area containing an image of a still object. This is because, since the area containing the image of the still object is to be still included in following frames even after an elapse of time, it is highly likely that the same feature point is to be extracted when feature point extraction is performed on following frames. For this reason, feature point extraction is performed focusing on the area containing a moving object in the second frame following the first frame. It is to be noted that, when the first frame contains the image of the moving object, feature point extraction for the still object and the moving object may be performed on the area which is in each of the following frames including the second frame and corresponding to the area containing the image of the moving object in the first frame.

In addition, extraction circuit 302c executes the processing of extracting the feature points in the videos obtained by obtaining circuit 302a in the case of a configuration in which no pre-processing is performed in calibrator 302. The feature points including the first feature points and the second feature points obtained by extraction circuit 302c executing the extraction processing may be stored in storage circuit 301.

A feature point indicates a point, an edge, or a certain area such as an outline of an object, a corner of an object or a space, and a cross point between object on a frame plane imaged in the frame. A feature point indicates a point, a side, or a certain area having a large difference in luminance or color from surroundings. The feature point is information indicated by, for example, (1) a coordinate position of the feature point on the two-dimensional image, (2) a vector representation of a gradient distribution of luminances or colors of pixels in a specific range which has the feature point as its center or includes the feature point. It is to be noted that the feature point may be, for example, other image information which is detected using texture information and information which has been subjected to frequency transform.

Feature points may be detected from all pixels in a frame, predetermined pixels in a frame, or may be detected while switching, for each frame, between detection from all pixels in a frame and detection from predetermined pixels. Predetermined pixels are, for example, pixels in the predetermined area in the frame. For example, when feature points are detected from frames divided from a certain captured video by performing repetitive processing, feature points are detected from all pixels in frames 21, 31, 41, 51, . . . captured at a predetermined timing, and feature points are detected from predetermined pixels in frames 22, 32, 42, 52, . . . captured at another timing.

A predetermined area is, for example, an area containing an image of a moving object. The moving object whose image is contained in the frame may be detected by: calculating a difference from a previous frame; calculating a difference from a background video; using video information obtained by, for example, automatically detecting the area containing the image of the moving object by machine learning; or using sound of footsteps of a person and driving sound of an automobile, etc., wireless communication, infrared rays, various sensors such as GPSs, etc. This eliminates the need to search pixels from which feature points on the image of the still object have been extracted when extracting feature points from the frames divided from the certain captured video by the repetitive processing. Thus, it is possible to reduce the processing time required for the feature point extraction. Furthermore, since the number of feature points to be extracted is limited, it is possible to reduce the amount of data to be stored in the storage. In addition, since the feature points are extracted from the pixels in images of the moving object, it is possible to extract feature points from various pixels, thereby increasing the camera calibration accuracy.

In addition, a predetermined area may be an area in which no feature point has been extracted in a frame extracted from the same video. This eliminates the need to search pixels from which feature points on the images of the still object have been extracted when extracting feature points from the frames divided from the certain captured video by the repetitive processing. Thus, it is possible to reduce the processing time required for the feature point extraction. In addition, in order to extract feature points on the pixels from which no feature point has been extracted, it is possible to extract feature points on various pixels, thereby increasing the camera calibration accuracy.

Matching circuit 302d performs matching between first feature points extracted by extraction circuit 302c. Matching circuit 302d performs matching between second feature points extracted by extraction circuit 302c. Matching circuit 302d associates similar feature points among the first feature points with each other, and outputs the associated similar feature points as a matching result. Matching circuit 302d makes a determination as to whether the feature points are similar to each other using a squared error or an absolute error. The matching result output in matching circuit 302d is, for example, stored in storage circuit 301. When matching circuit 302d obtains a new matching result by newly associating feature points extracted from frames captured at another timing, the new matching result is added to the matching result which has been previously obtained and stored in storage circuit 301.

Figure 8:
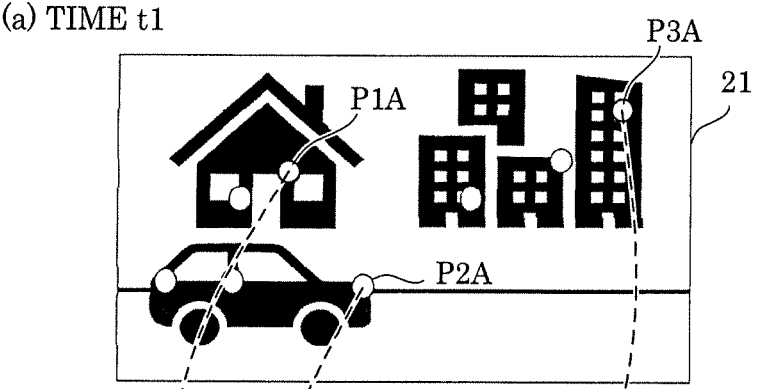
FIG. 8 is a diagram for explaining details of calibration processing.
Figure 8:
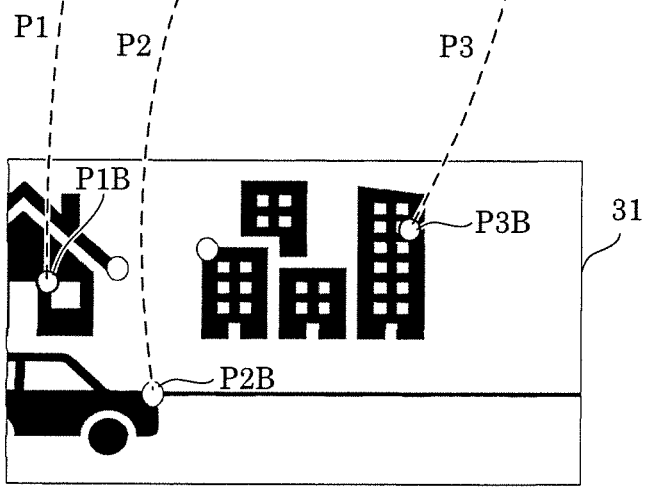

For example, as illustrated in (a) in FIG. 8, matching circuit 302d performs matching using the first feature points and associates feature point P1A and feature point P1B as matching point P1. Likewise, matching circuit 302d associates feature point P2A and feature point P2B as matching point P2, and associated feature point P3A and feature point P3B as matching point P3. In this way, as illustrated in (b) in FIG. 8, matching circuit 302d obtains matching points P1 to P3 as a matching result.

Figure 9:
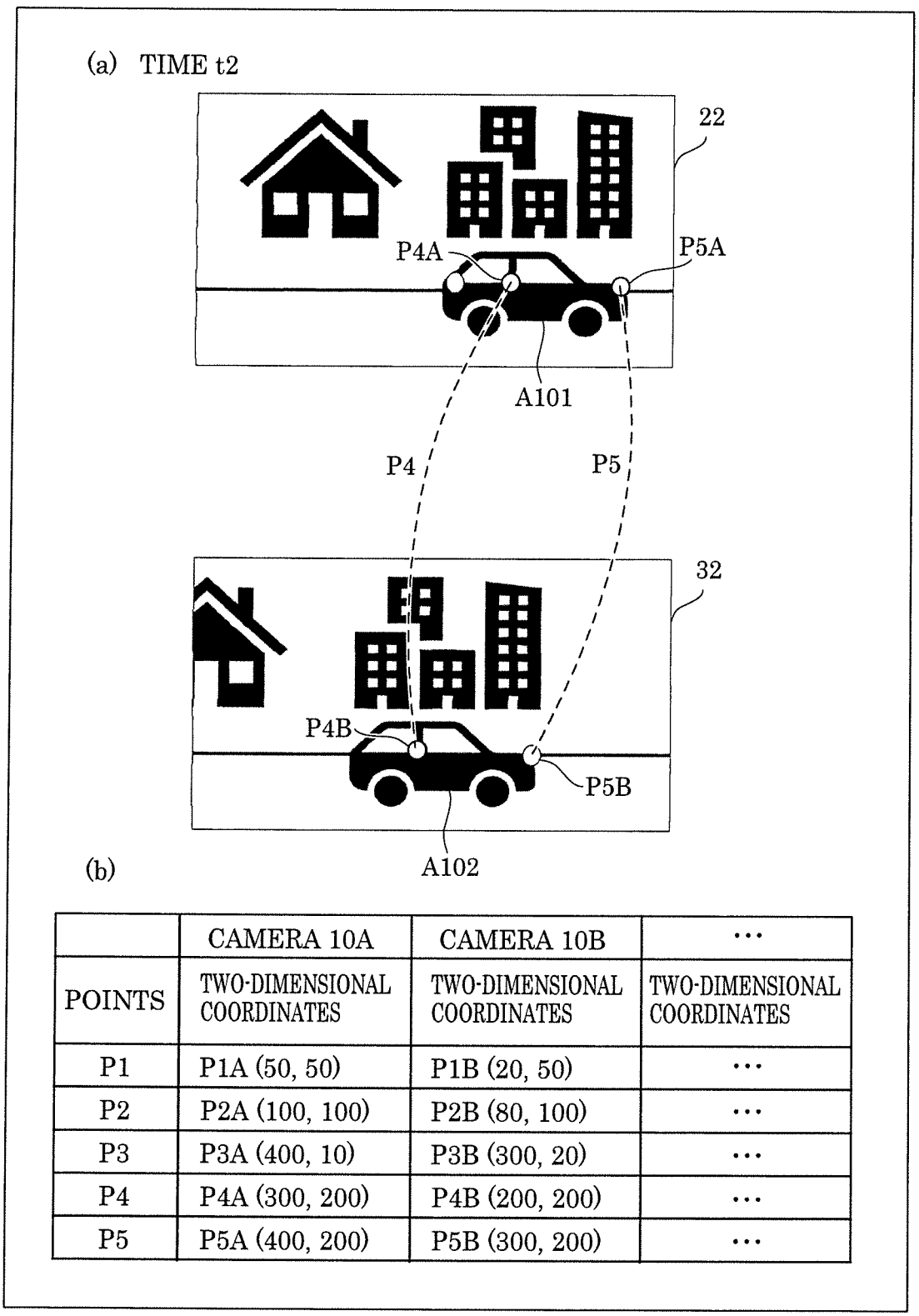
FIG. 9 is a diagram for explaining details of calibration processing.

In addition, for example, as illustrated in (a) in FIG. 9, matching circuit 302d performs matching using the second feature points, and associates feature point P4A and feature point P4B as matching point P4 and associates feature point P5A and feature point P5B as matching point P5. In this way, as illustrated in (b) in FIG. 9, matching circuit 302d adds matching points P4 and P5 to matching points P1 to P3 which have been already obtained, thereby obtaining matching points P1 to P5 as matching results.

Figure 10:
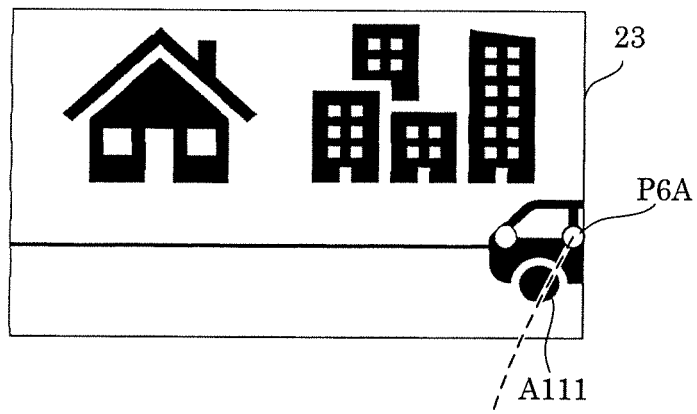
FIG. 10 is a diagram for explaining details of calibration processing.
Figure 10:
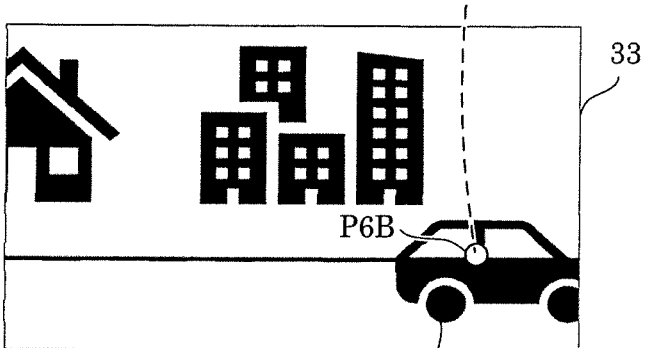

In addition, for example, as illustrated in (a) in FIG. 10, matching circuit 302d performs matching using third feature points and associates feature point P6A and feature point P6B as matching point P6. In this way, as illustrated in (b) in FIG. 10, matching circuit 302d adds matching point P6 to matching points P1 to P5 which have been already obtained, thereby obtaining matching points P1 to P6 as matching results.

It is to be noted that matching circuit 302d may determine whether the number of matching results is sufficient. Matching circuit 302d may perform a first determination method for determining whether the number of matching results is sufficient, based on whether the total number of matching results is a first number or more, and may perform a second determination method for determining whether the number of matching results is sufficient, based on whether the number of feature points included in matching results in divided areas when obtained by dividing each of videos is a second number or more. In addition, matching circuit 302d may determine whether the number of matching results is sufficient by combining the first determination method and the second determination method.

When the number of matching results is not sufficient, the reason why the number of matching results is insufficient may be fed back. The reason is, for example, that N points are needed to satisfy the required number of matching points, that there is no matching point in a certain area, or the like. In this way, it is possible to perform feature point extraction in a certain area according to the reason, which enables efficient extraction of matching points.

First, a description is given of the first determination method for determining whether the number of matching results is sufficient, based on whether the total number of matching results is the first number or more.

In this case, matching circuit 302d determines whether the total number of matching results is the first number (for example, 6) or more. When matching circuit 302d determines whether the total number of matching results is the first number or more, obtaining circuit 302a, pre-processing circuit 302b, and extraction circuit 302c execute calibration processing on frames captured at a timing different from the capturing timing of frames on which processing (calibration processing) have not yet been executed in videos. In this case, the total number of associated matching results between frames of time t1 and time t2 is 5 that is smaller than the first number. Thus, extraction circuit 302c is to extract third feature points from frames 23, 33, 43, 53, ... which are of time t3 different from time t1 and time t2 in the videos and include an area containing an image of a moving object. Matching circuit 302d performs matching between the third feature points extracted.

It is to be noted that the first number may be a value that is set according to circumstances, that is, may be a variable value without being limited to a fixed value. For example, the first number may be changed to a larger number as the position between imaging apparatuses which are currently imaging videos is more distant in order to increase the calibration accuracy.

Extraction circuit 302c and matching circuit 302d repeat extraction and matching on each of frames captured at a timing different from the capturing timing of frames on which extraction has been already performed in the videos until the total number of matching results obtained through the matching by matching circuit 302d reaches or exceeds the first number. When processing is repeated, pre-processing by pre-processing circuit 302b may be performed repeatedly.

For example, at the stage where extraction and matching have been performed on frames of time t1, the total number of matching results is 3 that is smaller than 6, and thus extraction and matching are repeated on other frames. The total number of matching results amounts to 6 by performing extraction and matching on frames of time t2 and time t3. Thus, matching circuit 302d determines that the number of matching results is sufficient.

In this way, extraction processing and matching processing in calibration processing are to be repeatedly executed on frames captured at a different timing. Thus, it is possible to calibrate camera parameters with high accuracy.

Next, a description if given of the second determination method for determining whether the number of matching results is sufficient, based on whether the number of feature points included in matching results in divided areas when obtained by dividing each of videos is the second number or more.

In this case, when each of videos is divided into areas, matching circuit 302d may determine whether the areas include an insufficient area in which the number of feature points obtained from the videos among the feature points associated in matching results is smaller than the second number. In other words, in this case, matching circuit 302d determines whether each of four areas defined by dividing the video by four includes sets of feature points associated in matching results in number that is the second number or more, and identifies, if any, an area in which the number of sets of feature points is smaller than the second number to be an insufficient area. It is to be noted that the number of areas divided from each video is not limited to 4, and may be 5 or more, or 2 or 3. In addition, the video may not be divided into divided areas having the same size. For example, a center part or a peripheral part of a frame may be set to be an area, an area may be set according to a scene such as a place on a road or a sidewalk or a place in a football court, or an area containing an image of a moving object may be set to be an area.

It is to be noted that the second number may be set to, for example, 2 when the number of divided areas is 4, that is the original video has been divided by 4. Alternatively, the second number may be set to, for example, 1 when the number of divided areas is 6.

Matching circuit 302d determines whether the number of matching results is sufficient by combining the first determination method and the second determination method. This is described next.

In other words, matching circuit 302d may determine that the number of matching results is sufficient when: (1) the total number of matching results is the first number or more according to the first determination method; and (2) the number of sets of feature points associated in matching results between divided areas is the second number or more according to the second determination method. In this case, for example, the first number in the first determination method may be set to 6, and the second number in the second determination method may be set to 1.

Figure 11:
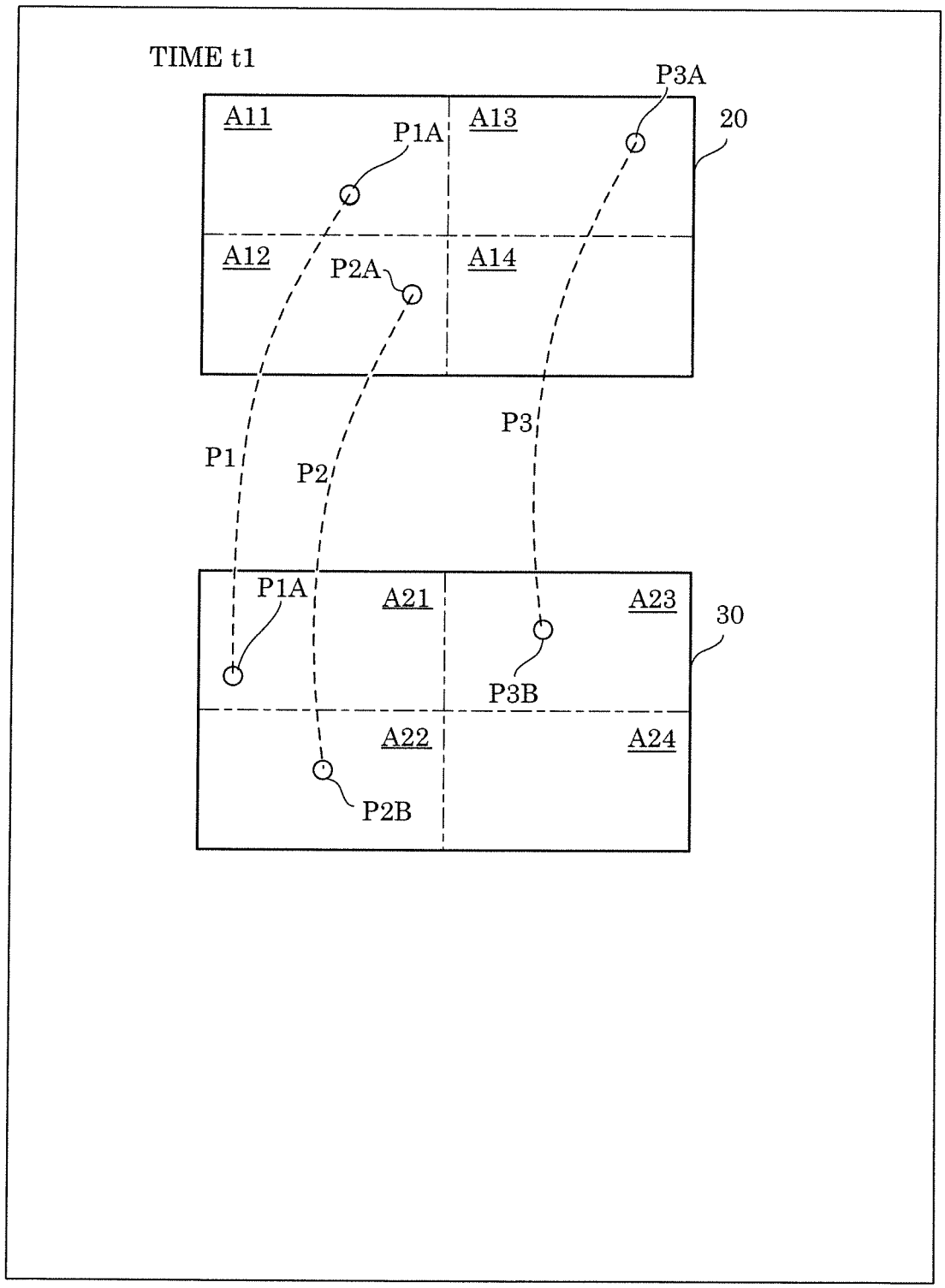
FIG. 11 is a diagram for explaining details of calibration processing.

For example, as illustrated in FIG. 11, video 20 includes four divided areas A11 to A14, and video 30 includes four divided areas A21 to A24. At the time when processing is performed on frames 21 and 31 of time t1, area A14 in video 20 does not include feature points P1A to P3A associated in matching results. Likewise, area A14 in video 30 does not include feature points P1A to P3A associated in the matching results. For this reason, matching circuit 302d identifies area A14 as an insufficient area in video 20, and identifies area A24 as an insufficient area in video 30.

When matching circuit 302d determines that there is an insufficient area in any of the videos, extraction circuit 302c extracts a fourth frame including an insufficient area containing an image of a moving object in the video, and extracts a fourth feature point from the insufficient area of the fourth frame. Fourth frames are, for example, frames 22, 32, 42, 52, . . . of time t2 in videos 20, 30, 40, 50, . . . . Matching circuit 302d performs matching between fourth feature points extracted.

Extraction circuit 302c and matching circuit 302d repeat extraction and matching on each of frames captured at a timing different from the capturing timing of frames on which extraction has been already performed in videos 20, 30, 40, 50, . . . until the total number of matching results obtained through the matching by matching circuit 302d between areas A11 to A14 and areas A2 to A24 reaches or exceeds the second number. When processing is repeated, pre-processing by pre-processing circuit 302b may be performed repeatedly.

Figure 12:
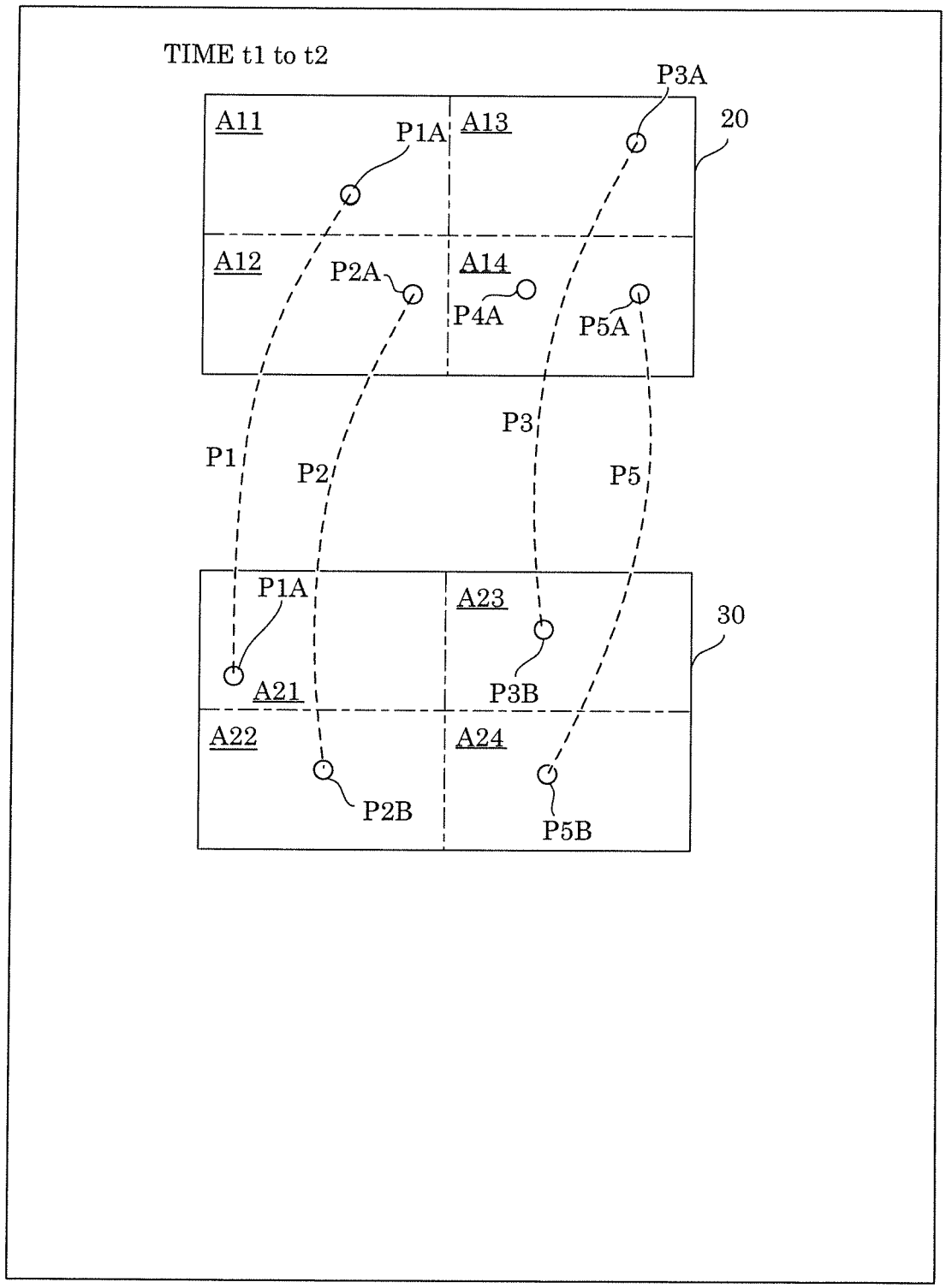
FIG. 12 is a diagram for explaining details of calibration processing.

For example, as illustrated in FIG. 12, extraction circuit 302c and matching circuit 302d perform extraction and matching, respectively, of feature points in frames 22, 32, 42, 52, . . . of time t2, thereby obtaining matching points P1 to P5 as described above. In this case, extraction circuit 302c extracts feature points in insufficient areas A14 and A24. Thus, feature points P4A and P5A are extracted from frame 22, and feature point P5B is extracted from frame 32. Thus, matching circuit 302d associates feature point P5A and feature point P5B as matching point P5. As a result, each of areas A11 to A14 and A21 to A24 has at least one feature point associated in one of the matching results. Thus, matching circuit 302d determines that the number of matching results is sufficient.

In this way, extraction processing and matching processing in calibration processing are to be repeatedly executed on frames captured at a different timing until the number of sets of feature points included in matching result reaches or exceeds the second number. Thus, it is possible to calibrate camera parameters with high accuracy.

Calibration circuit 302e executes calibration according to the results of matching by matching circuit 302d. Calibration circuit 302e calculates at least one of external parameters and internal parameters of cameras using the matching results obtained by imaging performed by cameras 100 in imaging apparatuses 10A to 10N. Calibration circuit 302e calculates at least one of external parameters and internal parameters of cameras using geometric constraints such as epipolar constraint based on the matching results.

Calibration processing is executed by, for example, associating specific points (or lines or surfaces each including points) between videos of imaging areas which overlap with each other at least partly among two-dimensional videos captured by imaging apparatuses 10A to 10N. This association is automatically performed by calibration circuit 302e which executes a program. The camera parameter calculated as a result of calibration is used, for example, to reconstruct a three-dimensional space.

Calibration circuit 302e further estimates three-dimensional positions on three-dimensional spaces in the respective matching results. Calibration circuit 302e estimates the three-dimensional positions on the three-dimensional spaces in the matching results by using a triangulation method.

Determination circuit 302f determines whether the accuracy of calibrated parameters is sufficient based on the three-dimensional positions estimated by calibration circuit 302e. When determination circuit 302f determines whether the accuracy of calibrated parameters is not sufficient, extraction circuit 302c, matching circuit 302d, calibration circuit 302e, and determination circuit 302f repeat extraction, matching, calibration, estimation, and determination on frames captured at a timing different from the capturing timing of frames on which extraction by extraction circuit 302c has already been performed in videos 20, 30, 40, 50, . . . , until the accuracy of parameters is determined to be sufficient by determination circuit 302f.

For example, determination circuit 302f determines whether each of errors (that are, re-projection errors) is smaller than a predetermined value. Here, the error is an error between (i) one of sets of two-dimensional coordinates in two-dimensional images obtainable when imaging apparatuses 10A to 10N image three-dimensional positions estimated by calibration circuit 302e and (ii) a corresponding set of two-dimensional coordinates included in sets of two-dimensional coordinates. The sets of two-dimensional coordinates are a set of two-dimensional coordinates of one of the first feature points and a set of two-dimensional coordinates of one of the second feature points. The first feature points and the second feature points are obtained from the plurality of videos captured by the plurality of imaging apparatuses In addition, determination circuit 302f may determine whether the accuracy of the parameters is sufficient based on whether at least one of the external parameters and internal parameters of cameras calculated by calibration circuit 302e are within a predetermined range. In other words, when at least one of the external parameters and internal parameters are within the predetermined range, determination circuit 302f determines that the accuracy of the parameters is sufficient. Otherwise, determination circuit 302f determines that the accuracy of the parameters is insufficient. The predetermined range is a range of conceivable values. The conceivable values are values calculated based on, for example, standards of imaging apparatuses 10A to 10N, install states of imaging apparatuses 10A to 10N, and previous calibration values.

When it is determined that the error is larger than a predetermined value, extraction circuit 302c, matching circuit 302d, calibration circuit 302e, and determination circuit 302f repeat extraction, matching, calibration, estimation, and determination, respectively, on frames captured at a different timing between videos 20, 30, 40, 50, . . . until an error is determined to be smaller than or equal to the predetermined value by determination circuit 302f.

[2-4. Configurations of Three-Dimensional Space Reconstruction Apparatus and Three-Dimensional Space Recognition Apparatus]

Next, referring back to FIG. 2, configurations of three-dimensional space reconstruction apparatus 3000 and three-dimensional space recognition apparatus 4000 are to be described.

Three-dimensional space reconstruction apparatus 3000 is implemented by use of a computer, and includes a storage apparatus and an arithmetic processing apparatus that are not illustrated. Model generator 3002a illustrated in FIG. 2 is a constituent element that is implemented by the arithmetic processing apparatus executing a program for generating three-dimensional model data (three-dimensional space reconstruction), which is stored in the storage apparatus.

Model generator 3002a reconstructs (performs modelling of) a three-dimensional shape of a subject, based on video data and camera parameters that three-dimensional space reconstruction apparatus 3000 has received from imaging system 1000 and stored in the storage apparatus. Data on a three-dimensional model generated by three-dimensional modeling is stored in the storage apparatus. In addition, the data is transmitted to three-dimensional space recognition apparatus 4000.

Three-dimensional space recognition apparatus 4000 is implemented by use of a computer, and includes a storage apparatus and an arithmetic processing unit that are not illustrated. Viewpoint determiner 4002a, renderer 4002b, scene analyzer 4002c, and tracker 4002d illustrated in FIG. 2 are constituent elements that are implemented by the arithmetic processing apparatus executing a program for three-dimensional space recognition that is stored in the storage apparatus. Depending on the intended use, three-dimensional space recognition apparatus 4000 may not include some of the functional constituent elements. For example, when three-dimensional space recognition apparatus 4000 is intended to be used to generate a free-viewpoint video, three-dimensional space recognition apparatus 4000 may not include scene analyzer 4002c and tracker 4002d. When three-dimensional space recognition apparatus 4000 is used as part of a monitoring system, a monitoring system having a higher functionality is achieved by providing three-dimensional space recognition apparatus 4000 with scene analyzer 4002c and tracker 4002d.

Viewpoint determiner 4002a determines a virtual viewpoint onto which a three-dimensional model provided from three-dimensional space reconstruction apparatus 3000 is projected. In the determination, for example, when a video captured at a specific time from a specific viewpoint is requested from user device 2000, the specific viewpoint is determined as the virtual viewpoint onto which a three-dimensional model is projected. Alternatively, a viewpoint that is set in advance may be determined as the virtual viewpoint onto which a three-dimensional model is projected. As the virtual viewpoint onto which the three-dimensional model is projected, the following may be determined: a viewpoint from which a face of a player near a goal is seen from the front in the case of a free-viewpoint video of a sporting event; or a viewpoint from which a face of a person near an entrance is seen from the front in the case of a video obtained by a monitoring apparatus. A new viewpoint may alternatively be determined as the virtual viewpoint in response to a request from scene analyzer 4002c or tracker 4002d described later. When the virtual viewpoint is determined, information indicating the determined virtual viewpoint (hereafter, referred to as virtual viewpoint information) is delivered from viewpoint determiner 4002a to renderer 4002b.

Renderer 4002b uses the data on the three-dimensional model received from three-dimensional space reconstruction apparatus 3000, the virtual viewpoint information received from viewpoint determiner 4002a, and the video data received from imaging system 1000 to generate a free-viewpoint video. In generating the free-viewpoint video, the three-dimensional model is projected onto the virtual viewpoint indicated by the virtual viewpoint information. At this time, to determine a color and texture of a subject contained in the free-viewpoint video, information on a color and texture of each subject contained in video data captured by an imaging apparatus that is close to the virtual viewpoint is preferentially used. The generated free-viewpoint video may be delivered to scene analyzer 4002c or may be distributed to user device 2000 to display the free-viewpoint video. The free-viewpoint video may be alternatively stored in the storage apparatus included in three-dimensional space recognition apparatus 4000 or an external storage apparatus as free-viewpoint video data.

Scene analyzer 4002c analyzes data on the three-dimensional model received from three-dimensional space reconstruction apparatus 3000 to identify a subject, for example. A result of the analysis may be delivered to tracker 4002d or may be distributed together with the free-viewpoint video to user device 2000 to be displayed on user device 2000. The result may be alternatively stored in the storage apparatus included in three-dimensional space recognition apparatus 4000 or an external storage apparatus as data on the result of analyzing the free-viewpoint video. According to the result of the analysis, scene analyzer 4002c may request viewpoint determiner 4002a to determine a virtual viewpoint at another time or from another position.

Tracker 4002d tracks a specific subject based on the data on the three-dimensional model received from three-dimensional space reconstruction apparatus 3000. A result of the tracking may be distributed together with the free-viewpoint video to user device 2000 to be displayed on user device 2000. If, for example, the tracking of the specific subject is impossible, tracker 4002d may request viewpoint determiner 4002a to determine a virtual viewpoint at another time or from another position.

[2-5. Configuration of User Device]

User device 2000 is an apparatus that includes a communicator and a display not illustrated, such as a television receiver, a personal computer, or a portable terminal. A free-viewpoint video received from three-dimensional space recognition apparatus 4000 via the communicator is displayed on the display of the user device.

User device 2000 may include an input apparatus that is implemented by a touch screen, a track pad, a keyboard, a mouse, a microphone, other kinds of controllers, or a combination thereof. User device 5000 may receive input of a request regarding the three-dimensional space reconstruction or the three-dimensional space recognition from a user via the input apparatus. For example, when input of a request for displaying a video captured at a specific time from a specific viewpoint is received, this request is transmitted from the communicator of user device 2000 to three-dimensional space recognition apparatus 4000. For example, when a request for displaying a free-viewpoint video of a specific subject is received, this request may be transmitted from the communicator of user device 2000 to three-dimensional space reconstruction apparatus 3000 or three-dimensional space recognition apparatus 4000. For example, when input of a request for designating a specific subject to be tracked is received, this request may be transmitted to three-dimensional space recognition apparatus 4000.

[2-6. Others]

The configuration of imaging system 1000, the configurations of three-dimensional space reconstruction apparatus 3000 and three-dimensional space recognition apparatus 4000 that use video data and camera parameters received from imaging system 1000, and the configuration of user device 2000 that receives, for instance, a free-viewpoint video from three-dimensional space recognition apparatus 4000 and displays the free-viewpoint video in the present embodiment have been described above. It is to be noted that these configurations are not limited to those in the above description.

In the above configuration, each of control apparatus 200, three-dimensional space reconstruction apparatus 3000, and three-dimensional space recognition apparatus 4000 is described such that the apparatus is implemented by use of a computer, but some or all of these apparatuses may be combined to be mounted in one or more computers.

User interface circuit 400 and user device 2000 may be the same apparatus. That is, similarly to user device 2000, user interface circuit 400 may receive a video distributed from three-dimensional space recognition apparatus 4000, and may display the video to a system administrator. The system administrator can input a request for controlling three-dimensional space reconstruction apparatus 3000 and three-dimensional space recognition apparatus 4000 according to the displayed video if the system administrator is an administrator of the imaging system and at the same time is an administrator of a free-viewpoint video distributing system or a monitoring system that includes three-dimensional space reconstruction apparatus 3000 and three-dimensional space recognition apparatus 4000.

[3. Operations]

Next, operations by imaging system 1000 according to the present embodiment to achieve the calibration performed at an appropriate time will be described.

Figure 13:
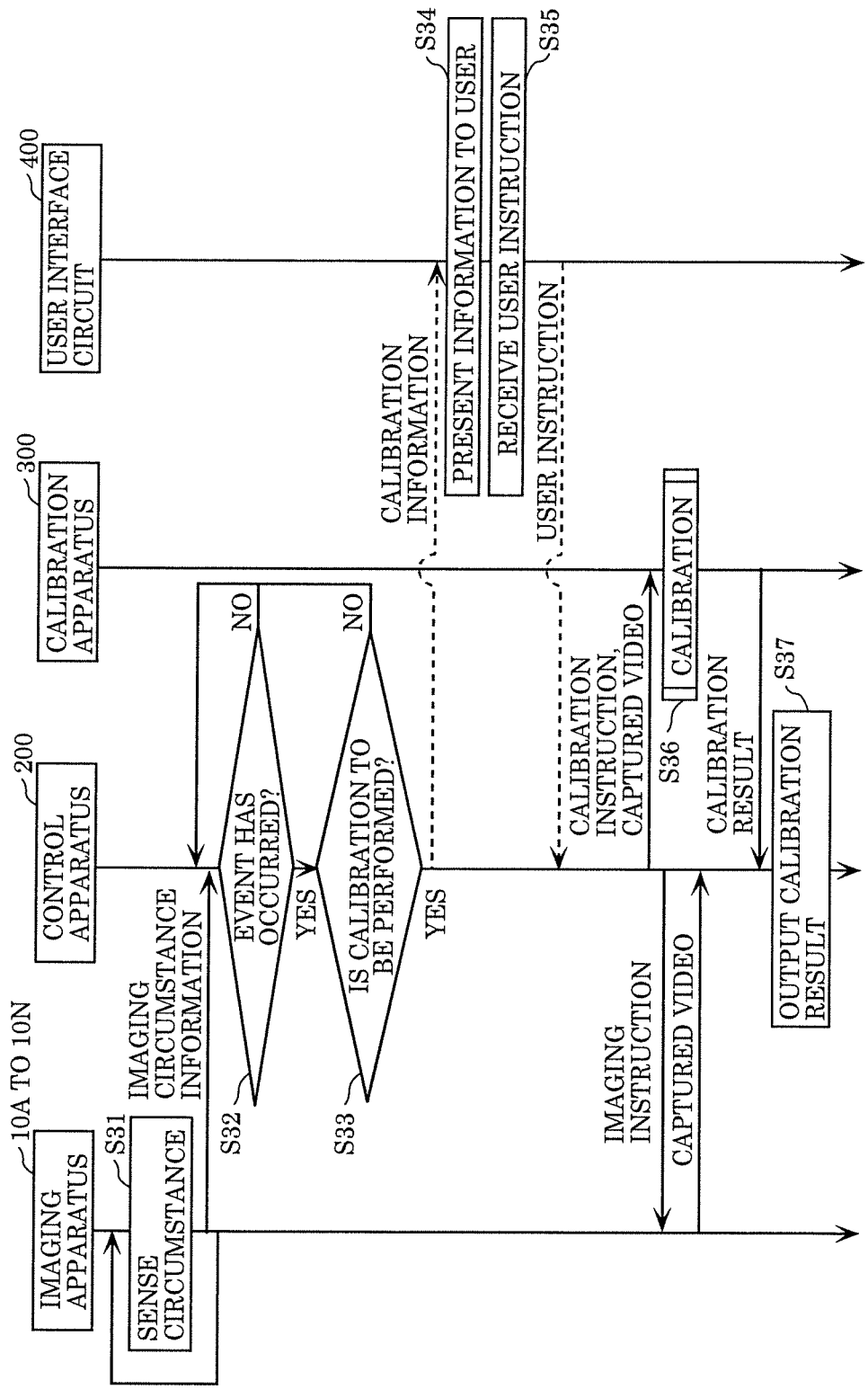
FIG. 13 is a sequence diagram illustrating a series of operations executed by an imaging system according to Embodiment 1.

To perform the calibration at an appropriate time, imaging system 1000 determines whether to perform the calibration when a circumstance about an imaging apparatus or a circumstance of the surrounding of the imaging apparatus (event) change. FIG. 13 is a sequence diagram used to describe a series of operations carried out by imaging system 1000 according to the present embodiment, including the determination as to whether the calibration is to be performed. It is to be noted that in FIG. 13, imaging apparatus 10 represents any one of imaging apparatuses 10A to 10N illustrated in FIG. 2. In imaging apparatus 10 during imaging, circumstance sensor 160 senses at least one of a circumstance about camera 100 (or imaging apparatus 10) and a circumstance in the predetermined space including the imaging area of camera 100, all the time or in a predetermined cycle (Step S31). The sensed circumstance is output from circumstance sensor 160 as imaging circumstance information and transmitted to control apparatus 200.

In control apparatus 200, event detector 202a detects an occurrence of a predetermined event, based on the received imaging circumstance information (Step S32).

The predetermined event is a cause of making current camera parameters no longer accurately indicate a position of camera 100, for instance. Specifically, for example, the event is an event that causes camera 100 to move or an event highly likely to cause camera 100 to move, which are already described in the description of the configuration. Even when camera 100 has not moved, an event that changes an imaging area or an event highly likely to have changed the imaging area may be detected as the predetermined event.

Examples of the imaging circumstance information to be used to detect such events include information on video data output from image sensor 104, information indicating a position, tilt, and shaking of camera 100 that is output from motion sensor 105 or 125. In the case of the video data, for example, a video is analyzed, by which whether the position, for instance, of camera 100 is changed can be estimated based on a change that has occurred in an area that is estimated to be a background area or a change in the size of the background area that occupies in the video.

The imaging circumstance information may be information that is output from operation detector 106 or 126 and indicates a predetermined operation of camera 100 or stand 120. More specifically, the imaging circumstance information indicates a change in a focal distance or exposure of camera 100, switch between on and off of camera 100, and a movement of a pan head of stand 120, for instance. The imaging circumstance information may indicate such operations no matter whether the operations are caused by a manual operation or automatic control of imaging apparatus 10.

The camera parameters may not correctly reflect a state of camera 100 that has performed the predetermined operation. For example, if the focal distance changes, internal parameters also change accordingly. There is a case where a user unintentionally changes a position or an orientation of camera 100 before or after a battery change. The change also changes external parameters of camera 100. As another case, when camera 100 is moved while being off, motion sensor 105 of camera 100 cannot sense this movement. Therefore, after camera 100 is turned on again, the camera parameters of camera 100 that have been used before camera 100 is turned off do not correctly reflect the position and the orientation of camera 100. In addition, an operation of rotating or moving vertically the pan head of stand 120 involves change in the position or the orientation of camera 100 (hereafter, may be referred to as an operation of camera 100, which also includes an operation of stand 120). Accordingly, the accuracy of camera parameters can be maintained by detecting a predetermined operation highly likely to involve change in the state of camera 100 and determining whether to perform the calibration based on the detection.

The imaging circumstance information may be information on sound around imaging apparatus 10, which is output from sound collector 107 or 147.

Event detector 202*a* detects the occurrence of an event when a change over time indicated by such imaging circumstance information exceeds a predetermined threshold (YES in Step S32). This predetermined threshold is an example of a first threshold in the present embodiment.

When the occurrence of an event is detected (YES in Step 32), event detector 202*a* determines whether to perform calibration based on, for example, the magnitude of the change over time indicated by the information (Step S33). For example, the predetermined threshold is determined in consideration of the magnitude of an influence of continuously using current camera parameters, on the accuracy of three-dimensional space reconstruction, based on the magnitude of movement of camera 100 indicated by the imaging circumstance information. The determination as to whether to perform the calibration is made based on, for example, whether the change exceeds a predetermined threshold greater than the first threshold. The predetermined threshold greater than the first threshold is an example of a second threshold in the present embodiment.

The predetermined event may be an event highly likely to allow the calibration with high accuracy. For example, calibration that is performed using a video that includes many feature points is likely to provide camera parameters with a higher accuracy (reliability).

Examples of imaging circumstance information used in detecting such an event also include information indicated by video data output from image sensor 104 described above. For example, when feature points are extracted by analyzing a video, and a total number of the extracted feature points is greater than or equal to a predetermined number, it may be determined that the predetermined event has occurred (YES in Step S32) and that the calibration is to be performed (YES in Step S33).

The predetermined event may be alternatively an event that has less influence on convenience of a user. For example, when a match is in a time period during which the match does not progress in a sporting event, such as halftime, may be detected as an occurrence of the predetermined event. In a ball game, few users pay their attention to a place where neither a ball nor a person is present, and thus a state where an entire imaging area includes neither a ball nor a person may be detected as an occurrence of the predetermined event. In a case of a monitoring system, a state where an imaging area and its surroundings include neither a person nor an automobile may be detected as an occurrence of the predetermined event.

Examples of the imaging circumstance information to be used to detect such events also include the information indicated by video data output from image sensor 104 described above and information on sound around imaging apparatus 10, which is output from sound collector 107 or 147. In the case of video data, for example, if analysis of a video shows that the video contains no image of a predetermined object such as a person, it may be determined that the predetermined event has occurred (YES in Step S32) and that the calibration is to be performed (YES in Step S33). In the case of the information on sound, whether a game is in progress, whether a whistle is blown, or whether a voice or sound of footsteps of a person, or engine sound or driving sound of an automobile is produced around imaging apparatus 10, for instance, may be determined by analyzing the sound.

In addition, depending on a kind of an operation performed on camera 100, the operation may be determined as occurrence of the predetermined event. This is because, for example, when camera 100 is re-activated, a battery is replaced, or a lens is attached or detached, the imaging area of camera 100 is highly likely to be changed. Such events are detected based also on information output from operation detector 106. For example, a battery or a lens is replaced while camera 100 is off, and thus an operation of starting camera 100 occurs before the start of capturing an image. Hence, for example, when event detector 202*a* receives information that indicates detection of an operation of the activation, event detector 202*a* may determine that the predetermined event has occurred. In subsequent Step S33, the calibration may be determined to be performed as an indispensable operation after the activation based on another item of imaging circumstance information.

Event detector 202*a* may detect an occurrence of the predetermined event when a predetermined time has elapsed since previous calibration of camera 100. For example, event detector 202*a* keeps a log of performing calibration in storage 201, refers to a time indicated by timer 203 included in control apparatus 200 to calculate an elapsed time from the previous calibration, and detects occurrence of the predetermined event when the elapsed time exceeds a predetermined time.

This causes the calibration of camera 100 to be performed with a predetermined frequency or higher. For example, an occasion of updating the camera parameters is ensured when changes that fall below the second threshold that is used to determine whether to perform the calibration are accumulated in camera 100, and camera parameters deviate from the actual state of camera 100 without performing the calibration.

When it is determined that the calibration is not to be performed (NO in Step S33), event detector 202*a* returns to a standby state for receiving the imaging circumstance information.

When it is determined that the calibration is to be performed (YES in Step S33), event detector 202*a* outputs the calibration information.

The calibration information contains information on camera 100 (or imaging apparatus 10 that includes camera 100) which is to be caused to perform the calibration and a reason for determining that the calibration is to be performed (the event described above). FIG. 14A and FIG. 14B each illustrate an example of a data configuration of the calibration information.

In the example illustrated in FIG. 14A, a target which is to be caused to perform the calibration is shown as imaging apparatus 10A, which includes camera 100 that is the target (see "10A" in the column "CALIBRATION TARGET"). In addition, the reason for performing the calibration is shown as "PAN HEAD ROTATED/MOVED" in the column "REA- SON" together with a reason code of 20. Such calibration information is output when the imaging circumstance information that event detector 202a has received from circumstance sensor 160 of imaging apparatus 10A indicates rotation/movement of the pan head that exceeds the first threshold and the second threshold.

In the example illustrated in FIG. 14B, it is indicated that cameras 100 included in all of imaging apparatuses 10 are to be subjected to the camera calibration (see "A11" in the column "CALIBRATION TARGET"). In addition, the reason for performing the camera calibration is shown as "HALFTIME DETECTED" in the column "REASON" together with a reason code of 100. Such camera calibration information is output when event detector 202a estimates that halftime of a sport match that is held in a predetermined space that includes an imaging area has started, based on the imaging circumstance information that event detector 202a has received from circumstance sensor 160 of one of imaging apparatuses 10. As described above, depending on details of the detected event, event detector 202a may determine that cameras 100 other than camera 100 included in imaging apparatus 10 which has transmitted the imaging circumstance information are to perform the camera calibration.

The calibration information is input to calibration instructor 202b. Upon receiving the calibration information, calibration instructor 202b generates a calibration instruction based on contents of the calibration information, and transmits the generated calibration instruction to imaging apparatus 10 that includes camera 100 to which the instruction is directed.

The calibration information may be transmitted to user interface circuit 400 to be presented to a user such as a system administrator (Step S34). Based on the information, the user inputs an instruction to cause target camera(s) 100 to perform the calibration, via user interface circuit 400 (RECEIVE INSTRUCTION in Step S35). The input instruction is transmitted to control apparatus 200.

Camera 100 of imaging apparatus 10 which has received an imaging instruction performs imaging processing. In addition, calibration apparatus 300 which has received a calibration instruction performs calibration processing (Step S36). The calibration processing is executed in the calibration apparatus based on the calibration instruction, and calibration of the external parameters of all imaging apparatuses 10A to 10N is executed. It is to be noted that calibration may be executed in controller 102 of camera 100 when calibration of internal parameters is executed. The camera parameters calculated by executing the calibration processing are output to three-dimensional space reconstruction apparatus 3000 (Step S37).

Next, a specific example of calibration processing is described.

Figure 15:
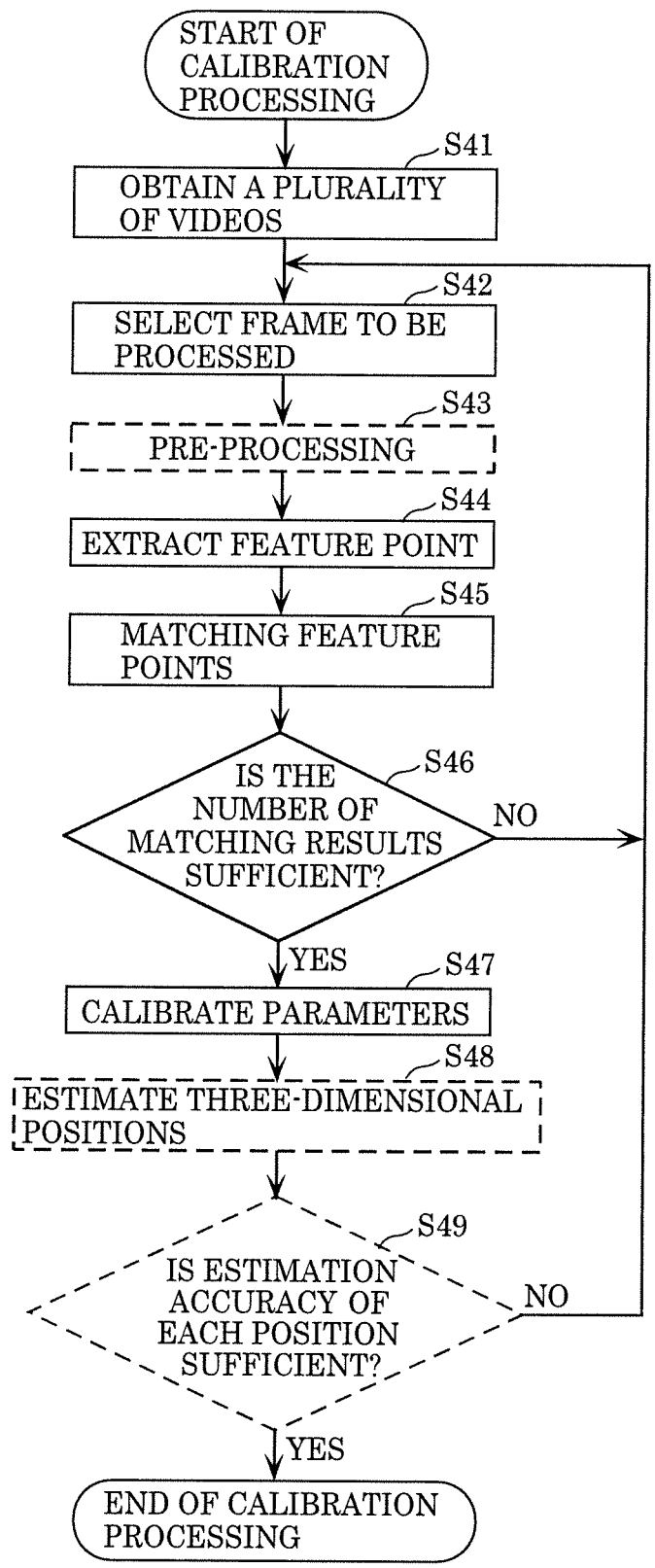
FIG. 15 is a flow chart illustrating an example of calibration processing according to Embodiment 1.

FIG. 15 is a flow chart illustrating the example of the calibration processing according to Embodiment 1.

In the calibration processing in calibration apparatus 300 according to this embodiment, first, obtaining circuit 302a obtains a plurality of videos which have been captured by imaging apparatuses 10A to 10N and each of which includes a plurality of frames (S41).

Next, pre-processing circuit 302b selects frames to be processed from the plurality of videos obtained (S42). Pre-processing circuit 302b selects, for example, first frames of time t1. It is to be noted that the process of selecting the frames to be processed may be performed by another processing circuit such as extraction circuit 302c when calibration apparatus 300 has a configuration without pre-processing circuit 302b.

Here, when selecting the frames, it is also excellent to select frames of a predetermined imaging time or later from capturing time of frames already selected in Step S42. Alternatively, it is also excellent to select frames at an interval corresponding to a predetermined number of frames from the frames already selected in Step S42. Alternatively, it is also excellent to select frames each containing an image of a moving object among the plurality of frames. Alternatively, it is also excellent to select frames each containing an image of a moving object in predetermined areas in the frames, based on the result of Step S49 to be described later. With this, it is possible to prevent pixel positions of feature points to be extracted in Step S44 from being dominant in particular areas when repeating Steps S42 to S49.

Next, pre-processing circuit 302b executes pre-processing on first frames included in the plurality of videos (S43).

Extraction circuit 302c then extracts first feature points from the pre-processed first frames (S44).

Matching circuit 302d performs matching between a plurality of first feature points extracted (S45).

Matching circuit 302d may determine whether the number of matching results is sufficient (S46).

Matching circuit 302d returns to Step S42 when the number of matching results is not sufficient (NO in S46).

For example, in the example described in FIG. 8, matching circuit 302d returns to Step S42 because the matching results based on the plurality of first feature points obtained from the first frames are three matching points P1 to P3 and the number of the matching results is smaller than the first number. Pre-processing circuit 302b, extraction circuit 302c, and matching circuit 302d execute Steps S43 to S45 on second frames of next time t2.

In other words, pre-processing circuit 302b executes pre-processing on the second frames, extraction circuit 302c extracts second feature points from the pre-processed second frames, and matching circuit 302d performs matching between the second feature points.

When matching circuit 302d determines that the number of matching results is sufficient by repeating Steps S42 to S46 (YES in S46), calibration circuit 302e at the next stage calculates parameters of imaging apparatuses 10A to 10N based on matching results (S47). In the example described with reference to FIGS. 8 to 10, the total number of matching results reaches or exceeds the first number by executing Steps S42 to S45 on the frames up to the third frames captured at the timing corresponding to time t3, and thus Step S47 is performed.

Calibration circuit 302e further estimates three-dimensional positions on three-dimensional spaces in the respective matching results (S48).

Determination circuit 302f then determines whether the accuracy of calibrated parameters is sufficient based on the three-dimensional positions estimated by calibration circuit 302e (S49).

Determination circuit 302f executes calibration processing when determination circuit 302f determines that the accuracy of the calibrated parameters is sufficient (YES in S49), and repeats Steps S42 to S49 on the frames of the next time when determination circuit 302f determines that the accuracy of the calibrated parameters is not sufficient (NO in S49).

[4. Method of Calibrating External Parameters]

In this embodiment, matching is performed on feature points at common three-dimensional space positions extracted from the plurality of images of imaging area A1 captured by cameras 100 of imaging apparatuses 10A to 10N. Based on the matching results, external parameters of imaging apparatuses 10A to 10N are calculated. More specifically, the external parameters of imaging apparatuses 10A to 10N are calculated using geometric constraints such as epipolar constraint based on the matching results.

[5. Effects, Etc.]

As described above, in this embodiment, calibration apparatuses 300 calibrates parameters of imaging apparatuses 10A to 10N which are disposed at positions different from one another and each of which captures images of the common three-dimensional space. Calibration apparatuses 300 includes obtaining circuit 302a, extraction circuit 302c, matching circuit 302d, and calibration circuit 302e. Obtaining circuit 302a obtains a plurality of videos 20, 30, 40, 50, . . . which have been captured by imaging apparatuses 10A to 10N and which include frames 21 to 25, frames 31 to 35, frames 41 to 45, frames 51 to 55, . . . , respectively. Extraction circuit 302c extracts feature points P1A, P2A, P3A, P1B, P2B, and P3B from frames 21, 31, 41, 51, . . . of videos 20, 30, 40, 50, . . . obtained by obtaining circuit 302a. Extraction circuit 302c further extracts feature points P4A, P5A, P6A, P4B, P5B, and P6B from areas A101, A102, A111, and A112 each containing an image of a moving object in frames 22, 32, 42, 52, . . . , 23, 33, 43, 53, . . . different from frames 21, 31, 41, 51, . . . of videos 20, 30, 40, 50, . . . . Matching circuit 302d performs mutual matching using feature points P1A, P2A, P3A, P1B, P2B, and P3B extracted by extraction circuit 302c, and performs mutual matching using feature points P4A, P5A, P6A, P4B, P5B, and P6B extracted by extraction circuit 302c. Calibration circuit 302e calculates parameters of imaging apparatuses 10A to 10N based on matching points P1 to P6 as the matching results obtained through the matching by matching circuit 302d.

In this way, extraction circuit 302c extracts feature points P1A, P2A, P3A, P1B, P2B, P3B from frames 21 to 25, frames 31 to 35, frames 41 to 45, frames 51 to 55, respectively, and extracts feature points P4A, P5A, P6A, P4B, P5B, and P6B from areas A101, A102, A111, and A112 each containing the image of the moving object in frames 22, 32, 42, 52, . . . , 23, 33, 43, 53, . . . . For this reason, calibration apparatus 300 is capable of adding and using feature points P4A, P5A, P6A, P4B, P5B, and P6B of the moving object as feature points for use in calibration of parameters. In other words, it is possible to effectively increase feature points obtainable from the videos captured by imaging apparatuses 10A to 10N, and thus it is possible to calibrate the parameters of imaging apparatuses 10A to 10N with high accuracy.

In addition, in this embodiment, extraction circuit 302c extracts, as second frames, frames 22, 32, 42, 52, . . . captured at the first timing in respective videos 20, 30, 40, 50, . . . and each of which includes areas A101 and A102 containing an image of the moving object. Extraction circuit 302c further extracts feature points P4A, P5A, P4B, P5B from second frames extracted from videos 20, 30, 40, 50, . . . .

For this reason, since feature points P4A, P5A, P4B, and P5B are extracted from frames 22, 32, 42, 52, . . . captured at the same timing among frames each containing the image of the moving object, the feature points are extracted from the frames captured when the moving object is located at a particular position on the three-dimensional space. For this reason, it is possible to effectively increase the feature points for use in calibration of the parameters of imaging apparatuses 10A to 10N.

In addition, in this embodiment, when the total number of matching results is smaller than the first number, extraction circuit 302c, matching circuit 302d, and calibration circuit 302e execute the next processing. Extraction circuit 302c extracts third feature points P6A and P6B from areas A111 and A112 third frames 23, 33, 43, 53, . . . captured at the second timing different from the first timing in videos 20, 30, 40, 50, . . . and includes areas A111 and A112 containing an image of the moving object. Matching circuit 302d performs matching between third feature points P6A and P6B extracted. Calibration circuit 302e calculates parameters of imaging apparatuses 10A to 10N, based on matching points P1 to P6 as matching results further including the matching result obtained through matching which has been newly performed.

Thus, it is possible to obtain a sufficient number of matching results. With this, it is possible to calibrate parameters with high accuracy.

In addition, in this embodiment, extraction circuit 302c and matching circuit 302d repeat extraction and matching on each of frames captured at a timing different from the capturing timing of frames on which extraction has been already performed in the videos until the total number of matching results obtained through the matching in matching circuit 302d reaches or exceeds the first number.

In this way, when a sufficient number of matching results is obtained, no extraction and matching are executed on frames captured at a different timing. Thus, it is possible to reduce processing load.

In addition, in this embodiment, when each of videos 20, 30, 40, 50, . . . is divided into areas A11 to A14 and areas A21 to A24 and when the areas include an insufficient area in which the number of feature points obtained from the videos among the feature points associated in matching results is smaller than the second number, extraction circuit 302c, matching circuit 302d, and calibration circuit 302e execute the next processing. Extraction circuit 302c extracts a fourth frame including an insufficient area containing an image of the moving object in each of videos 20, 30, 40, 50, . . . , and extracts a fourth feature point from the insufficient area of the fourth frame. Matching circuit 302d performs matching between fourth feature points extracted. Calibration circuit 302e calculates parameters of imaging apparatuses 10A to 10N, based on matching results further including the matching result obtained through matching which has been newly performed.

Thus, it is possible to obtain a sufficient number of matching results in the insufficient area. With this, it is possible to calibrate parameters with high accuracy. Furthermore, since it is only necessary to perform processing in the insufficient areas, it is possible to reduce processing load.

In addition, in this embodiment, extraction circuit 302c and matching circuit 302d repeat extraction and matching on each of frames captured at a timing different from the capturing timing of frames on which extraction has been already performed in the videos until the total number of matching results obtained through the matching in matching circuit 302d in each of the areas reaches or exceeds the second number.

In this way, when a sufficient number of matching results is obtained in the insufficient area, no extraction and matching are executed on frames captured at a different timing. Thus, it is possible to reduce processing load.

In addition, in this embodiment, calibration circuit 302e further estimates three-dimensional positions on three-dimensional spaces in the respective matching results. Calibration apparatus 300 further includes determination circuit 302f. Determination circuit 302f determines whether the accuracy of calibrated parameters is sufficient based on the three-dimensional positions estimated by calibration circuit 302e. When determination circuit 302f determines that the accuracy of the calibrated parameters is not sufficient, extraction circuit 302c, matching circuit 302d, calibration circuit 302e, and determination circuit 302f repeat extraction, matching, calibration, estimation, and determination on frames captured at a timing different from the capturing timing of frames on which extraction by extraction circuit 302c has already been performed in the videos until the accuracy of the parameters is determined to be sufficient by determination circuit 302f.

In this way, since the processing is repeated on other frames when the accuracy is low, it is possible to increase the accuracy of parameters obtainable by calibration.

In this embodiment, determination circuit 302f determines whether each of the errors is smaller than the predetermined value. Here, the errors are errors between (i) sets of two-dimensional coordinates in two-dimensional images obtainable when imaging apparatuses 10A to 10N images three-dimensional positions estimated by calibration circuit 302e and (ii) sets of two-dimensional coordinates which are sets of two-dimensional coordinates of first feature points and second feature points obtained from videos captured by the imaging apparatuses. When it is determined that the error is larger than a predetermined value, extraction circuit 302c, matching circuit 302d, calibration circuit 302e, and determination circuit 302f repeat extraction, matching, calibration, estimation, and determination, respectively, on frames captured at a different timing in videos 20, 30, 40, 50, . . . until an error is determined to be smaller than or equal to the predetermined value by determination circuit 302f. For this reason, it is possible to increase the accuracy of parameters obtainable by the calibration.

In addition, in the present embodiment, imaging system 1000 includes a plurality of cameras 100, circumstance sensor 160, and event detector 202a.

Cameras 100 capture videos of areas that at least partially overlap one another in a predetermined space, from positions different from one another.

Circumstance sensor 160 senses at least one of circumstances about respective cameras 100 and a circumstance in the predetermined space described above, and output the sensed circumstance as imaging circumstance information.

Based on this imaging circumstance information, event detector 202a detects occurrence of the predetermined event, and when detecting the occurrence of the predetermined event, event detector 202a determines whether to perform the camera calibration. When event detector 202a determines that the camera calibration is to be performed, event detector 202a outputs calibration information indicating that the calibration is to be performed.

Accordingly, it is determined whether performing the calibration is necessary or whether it is an appropriate timing to perform the calibration, based on statuses (event) of cameras 100 while capturing images or a status of a location where images are captured. Providing information that indicates the calibration to be performed allows the calibration to be performed on an appropriate target at an appropriate timing. In addition, an occasion of update to reflect the actual positions of cameras 100, for instance, on camera parameters is ensured also during imaging. By using the camera parameters that are updated in this manner, a state where the three-dimensional space reconstruction is properly performed is maintained, and as a result, stabilities of accuracy and applicability of the three-dimensional space recognition can be increased.

Imaging system 1000 may further include calibration instructor 202b that causes cameras 100 to perform the calibration. The calibration information indicates camera(s) 100 that is to perform the calibration, among cameras 100. The output calibration information is input to calibration instructor 202b, and calibration instructor 202b causes camera(s) 100 indicated by the calibration information to perform the calibration.

This enables the calibration based on the calibration information to be performed quickly even on camera 100, for example, disposed in a position that a person cannot readily approach. A state where the three-dimensional space reconstruction is properly performed is thus maintained, and as a result, stabilities of accuracy and applicability of the three-dimensional space recognition are increased.

In addition, the calibration information may further indicate details of the predetermined event, the occurrence of which is detected. When the calibration information indicates that there are two or more cameras 100 are to perform the calibration, calibration instructor 202b determines the order in which cameras 100 are to perform the calibration, based on the details of the predetermined event indicated by the calibration information, and causes two or more cameras 100 to perform the calibration in the determined order.

Depending on the circumstance in the predetermined space, there is a case where calibration with high accuracy can be performed quickly by all cameras simultaneously performing the calibration. By determining, in this manner, the order in which cameras 100 are to perform the calibration according to an event that is a reason why the calibration is to be performed, cameras 100 are to perform the calibration in an order that is appropriate for maintaining the state where the three-dimensional space reconstruction is appropriately executed. It is to be noted that "the order" also includes the case where cameras 100 perform the calibration in parallel.

Circumstance sensors 160 include image sensors 104 included in respective cameras 100. The imaging circumstance information output by circumstance sensors 160 may contain videos that are output by image sensors 104. In this case, event detector 202a extracts feature points included in the videos, and when the number of extracted feature points is greater than or equal to the predetermined number, event detector 202a may detect the occurrence of the predetermined event and determine that the calibration is to be performed.

The calibration that is performed using videos that include many feature points is likely to provide camera parameters with higher accuracy (reliability). That is, such a timing is an appropriate time to perform the calibration. By using the camera parameters that are obtained through the calibration performed at this timing, the three-dimensional space reconstruction is also performed with higher accuracy, and stabilities of the accuracy and applicability of the three-dimensional space recognition are increased.

Circumstance sensors 160 include image sensors 104 included in respective cameras 100. The imaging circumstance information output by circumstance sensors 160 may contain videos that are output by image sensors 104. In this case, event detector 202a determines whether the videos contain an image of a predetermined object, and when no image of the predetermined object is contained, the occurrence of the predetermined event may be detected, and event detector 202a may determine that the calibration is to be executed.

The predetermined object here indicates the importance of a scene captured by cameras 100 and refers to, for example, a person present in a monitoring zone, or a player or a ball in a ball game. Video data containing no image of such an object is less likely to be used to generate a free-viewpoint video. Thus, causing camera 100 that has generated such video data to perform the calibration increases, for a user, stabilities of the accuracy and applicability of the three-dimensional space recognition.

Circumstance sensors 160 may each include at least one of image sensors 104 included in respective cameras 100, motion sensors 105 or 125 that sense changes in position and orientation of respective cameras 100, or sound collectors 107 or 147 that collect sound produced in the predetermined space. The imaging circumstance information output by circumstance sensors 160 may be information output by at least one of image sensors 104, motion sensors 105 or 125, or sound collectors 107 or 147. In this case, event detector 202a may detect occurrence of the predetermined event when the imaging circumstance information indicates a change that exceeds the first threshold, and may determine that the calibration is to be performed when the imaging circumstance information indicates a change that exceeds the second threshold greater than the first threshold.

From the change in the information output from image sensors 104, for instance, it is possible to grasp a change that is highly likely to prevent the camera parameters from reflecting actual states of cameras 100 due to a change in the imaging areas of cameras 100, such as movements of cameras 100. However, if the calibration is performed even when a degree of this change is small, a time of usable video data is reduced, which may rather have an adverse effect on the three-dimensional space reconstruction. In view of this, whether to perform the calibration is determined according to the degree of change in circumstances about cameras 100 or a circumstance in the imaging area. This causes the calibration to be performed if a change has an influence on appropriately performing the three-dimensional space reconstruction. Whereas this causes the calibration not to be performed if performing the calibration itself has a greater influence on the three-dimensional space reconstruction than the change in the circumstance. A state where the three-dimensional space reconstruction is properly performed is thus maintained, and as a result, stabilities of accuracy and applicability of the three-dimensional space recognition are increased.

Circumstance sensors 160 may include operation detectors 126 that detect predetermined operations of respective cameras 100, and the imaging circumstance information output by circumstance sensors 160 may be information on the predetermined operations carried out, which is output from operation detectors 126. In this case, event detector 202a may detect occurrence of the predetermined event, based on the information on the predetermined operations carried out, which is indicated as the imaging circumstance information.

This causes the camera parameters to be updated in accordance with the change in states of cameras 100 due to operation of cameras 100 or stands 120, by which a state where the three-dimensional space reconstruction is appropriately performed is maintained, and as a result, stabilities of the accuracy and applicability of the three-dimensional space recognition are increased.

Event detector 202a may detect, for each of cameras 100, occurrence of the predetermined event when a predetermined time has elapsed since previous calibration is performed, and may determine that the calibration is to be performed. This causes each camera to perform the calibration with a predetermined frequency or higher. For example, a camera in which changes that are below a threshold for determining that the calibration is to be performed are accumulated is also caused to perform calibration, and an occasion of updating the camera parameters is ensured.

Imaging system 1000 may further include user interface circuit 400 to present information to a user. The calibration information may be presented to a user via user interface circuit 400.

This informs the user of imaging system 1000 which camera 100 is to execute or is executing the calibration, for example. In addition, based on a reason for performing the calibration indicated by the presented calibration information (details of the predetermined event), a user may determine the order in which cameras 100 that are to be subjected to the calibration execute the calibration.

[6. Variations]

[6-1. Variation 1]

In the above embodiment, all of the external parameters of the plurality of imaging apparatuses 10A to 10N are calibrated. However, when there is a need to calibrate external parameters of two or more of the imaging apparatuses fewer than the total number, there is no need to calibrate all of the external parameters of the plurality of imaging apparatuses 10A to 10N. In other words, it is also excellent to calibrate (i) external parameters of imaging apparatuses for which the external parameters need to be calibrated and (ii) at least one imaging apparatus for which the external parameters do not need to be calibrated.

[6-2. Variation 2]

Although control apparatus 200 performs calibration processing in the above embodiment, controller 102 of each of imaging apparatuses 10A to 10N may perform calibration processing. In other words, controller 102 may calibrate the external parameters of cameras 100 of imaging apparatuses 10A to 10N using a plurality of captured images obtained by cameras 100 of imaging apparatuses 10A to 10N respectively imaging markers located at different three-dimensional positions. Each of the markers has, for example, a predetermined shape, color, and/or the like, which allow(s) controller 102 to identify the area in which an image of the marker is included from a plurality of captured images. The marker may have a spherical shape, or may be a point light source such as a Light Emitting Diode (LED).

[6-3. Variation 3]

In the above embodiment, matching circuit 302d determines whether the number of matching results is sufficient in calibration processing in Step S46. When the result of the determination in Step S46 shows that the number of matching results is not sufficient: a frame to be processed is newly selected from a plurality of videos obtained; and the processing in Steps S42 to S45 are repeated on the selected frame. The processing in Steps S42 to S46 are repeated until the number of matching results is determined to be sufficient in determination in Step S46.

However, repetitive processing is not limited to repeating the processing in Steps S42 to S46 by newly selecting a frame to be processed from a plurality of videos until the number of matching results is determined to be sufficient as in the above case. For example, the greedy method may be used to perform calibration processing that yields a sufficient number of matching results by selecting, in advance, a frame that yields a sufficient number of matching results and performing matching of feature points on the pre-selected frame. In other words, in the calibration processing in this case, no feature point matching is performed on frames other than the pre-selected frames, and thus it is possible to reduce increase in processing load due to unsuccessful obtainment of a sufficient number of matching results and reduce increase in processing time.

Figure 16:
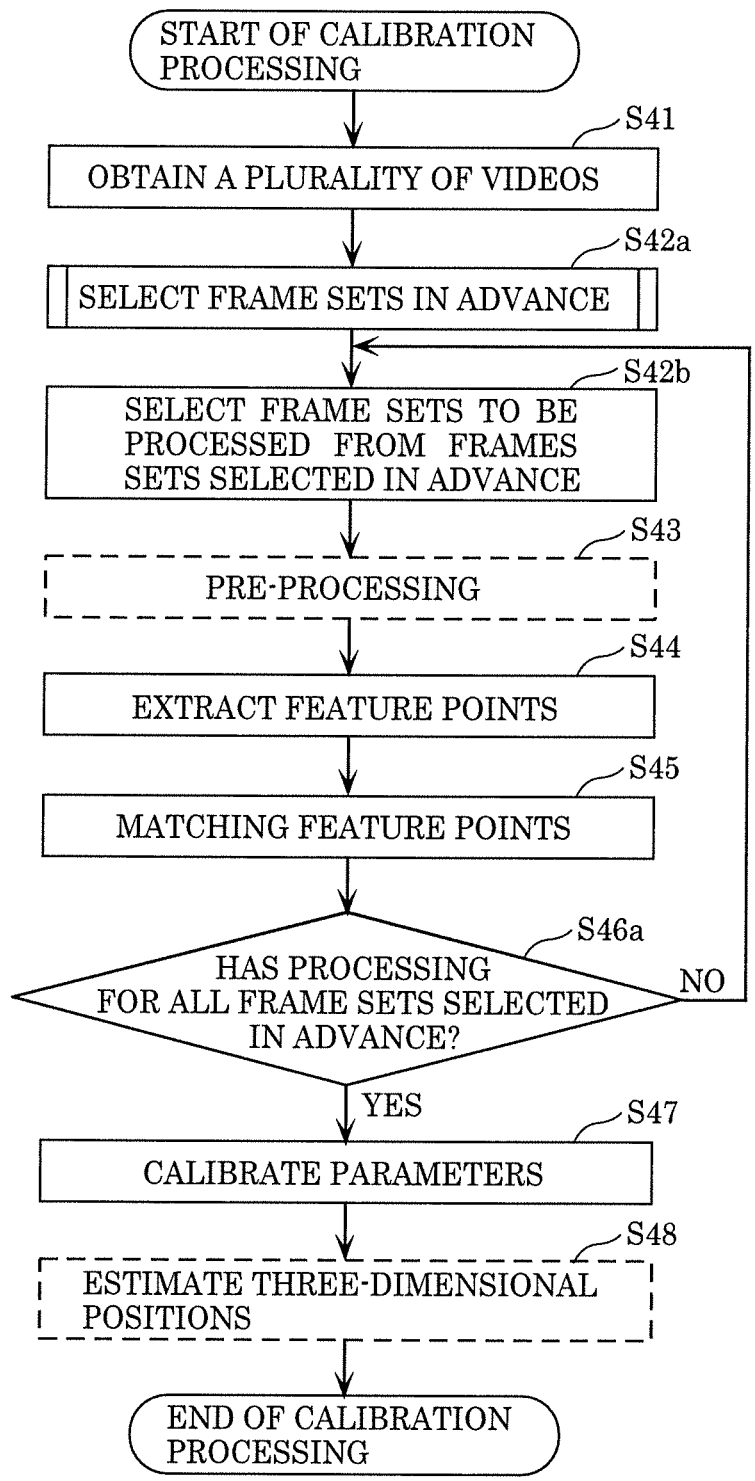
FIG. 16 is a flow chart illustrating an example of calibration processing according to Variation 3.
Figure 17:
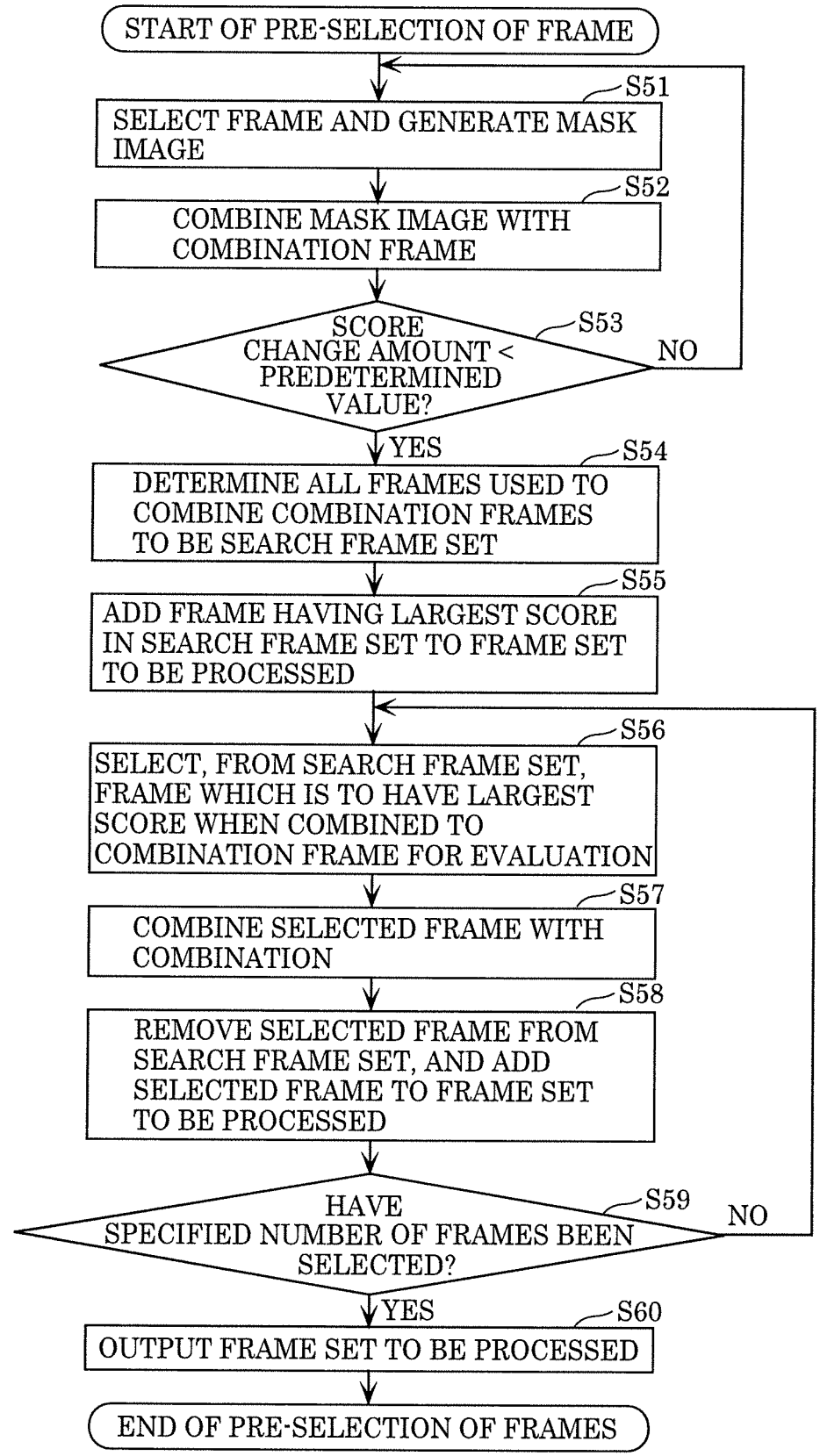
FIG. 17 is a flow chart illustrating a first example of frame pre-selecting processing.
Figure 18:
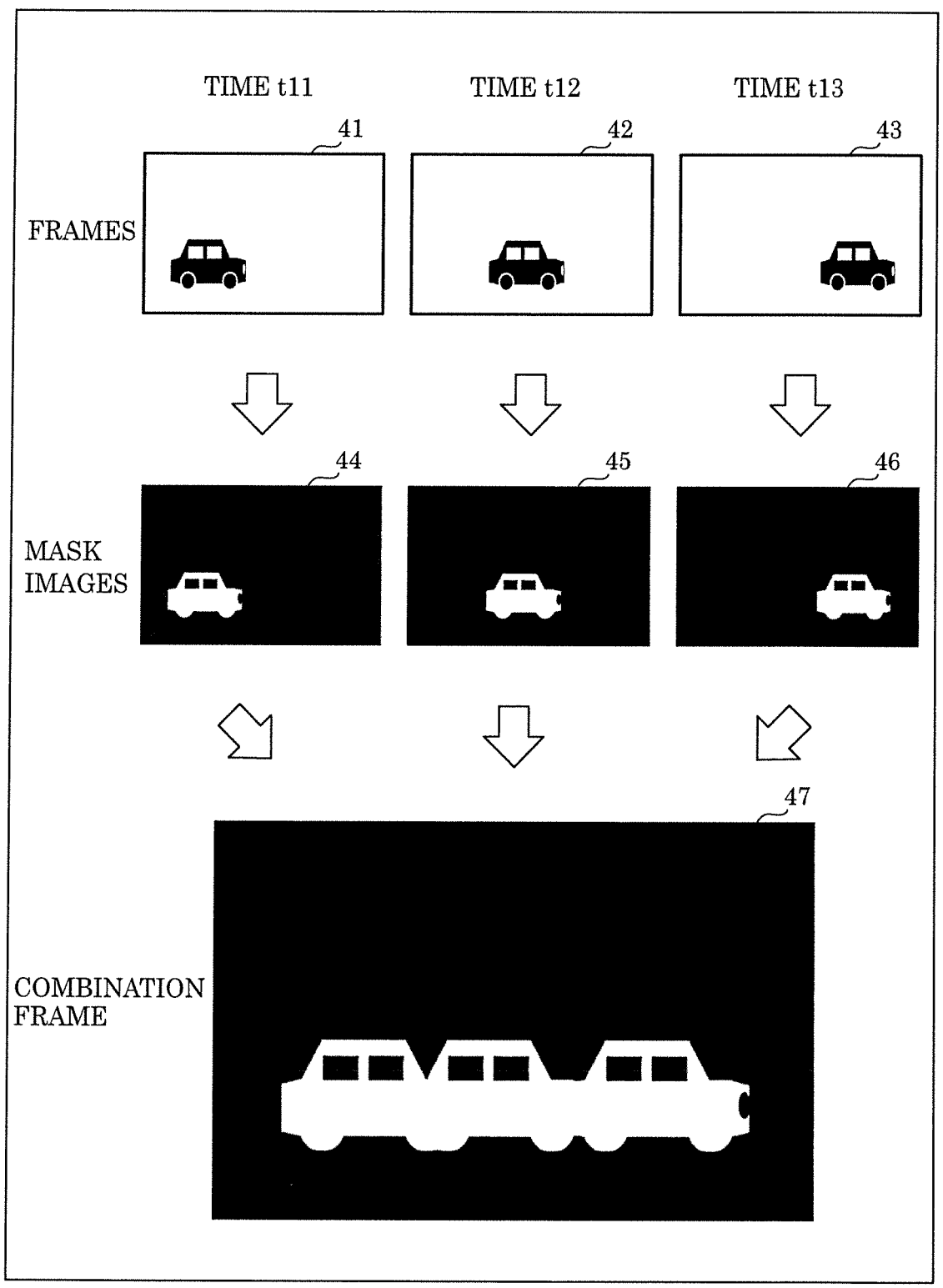
FIG. 18 is a diagram for explaining processing of generating mask image combination result from a plurality of frames.

The calibration processing in Variation 3 is described specifically with reference to FIGS. 16 to 18.

FIG. 16 is a flow chart illustrating an example of calibration processing according to Variation 3.

It is to be noted that calibration apparatus 300 according to this variation is different in function but can be implemented using the configuration of calibration apparatus 300 according to Embodiment 1, and thus calibration apparatus 300 is described using the constituent elements described with reference to FIG. 5.

In calibration processing in calibration apparatus 300 according to variation 3, Step S41 as in Embodiment 1 is performed.

Next, pre-processing circuit 302b performs frame pre-selecting processing of selecting, in advance, frame sets that yield a sufficient number of matching results from a plurality of videos obtained (S42a). Specific examples of the frame pre-selecting processing in Step S42a are described with reference to FIGS. 17 and 18.

FIG. 17 is a flow chart illustrating a first example of frame pre-selecting processing. FIG. 18 is a diagram for explaining processing of generating a mask image combination result from a plurality of frames.

Pre-processing circuit 302b selects a frame, and generates a mask image using the selected frame (S51). More specifically, pre-processing circuit 302b selects the frame captured at a latest timing among the plurality of videos obtained, and generates the mask image for the selected frame. For example, as illustrated in FIG. 18, pre-processing circuit 302b selects frame 43 at latest time t13, and generates, for selected frame 43, mask image 46 in which an area of a vehicle which is a foreground is represented by white pixels and an area of a background other than the foreground is represented by black pixels. It is to be noted that a mask image may be a mask image in which areas in an image are divided into a foreground and a background. Thus, the mask image in which the foreground area is represented by white pixels and the background area is represented by black pixels is a non-limiting example. It is only necessary that an area in a foreground be represented by first pixel values indicating that the area is a foreground area, and an area in a background be represented by second pixel values indicating that the area is a background area. The first pixel values and the second pixel values are mutually different values.

Next, pre-processing circuit 302b combines the generated mask image with a combination frame (S52). The combination frame is stored in storage circuit 301. Pre-processing circuit 302b reads out the combination frame stored in storage circuit 301, and combines the mask image generated in Step S51 with the read-out combination frame. Pre-processing circuit 302b then stores the new combination frame obtained as a result of the combination onto storage circuit 301. At this time, pre-processing circuit 302b may update the combination frame stored in storage circuit 301 to a combination frame obtained by new combination performed in Step S52.

It is to be noted that, at an initial stage of the processing, that is, at the stage at which an initial frame is selected from a plurality of videos, a combination frame is, for example, a vacant frame in which each of pixels of the combination frame does not have any pixel value. For this reason, pre-processing circuit 302b combines mask image 46 and a combination frame to generate a combination frame equivalent to mask image 46. In the combination performed in Step S52, pre-processing circuit 302b performs the combination in such a manner that the area which is the union of (i) the area in the foreground in the combination frame and (ii) the area in the foreground in the mask image generated in Step S51 is represented by white pixels indicating that the area is the foreground area when the combination frame and mask image 46 is combined. Thus, in the combination frame, the area other than the area which is the union of the foreground areas is the background area.

It is to be noted that the size and shape of the combination frame and the size and shape of each of the frames of each of the videos are equal to each other. In other words, the total number of pixels of the combination frame and the total number of pixels in each frame is equal to each other.

Next, pre-processing circuit 302b determines whether the change amount from a previous score to a current score of the combination frame is smaller than a predetermined value (S53). Here, each score of the combination frame is the number of pixels of the foreground area in the combination frame. In other words, the score is the number of white pixels in the combination frame. It is to be noted that the score is assumed to be 0 in an initial state for the processing. The score is stored in storage circuit 301. For this reason, at the stage before Step S53 is performed for the first time in calibration processing, the score increases from 0 by the number of pixels of the foreground area added. For example, the predetermined value is the number of pixels obtained by multiplying the total number of pixels in a frame by a predetermined rate. The predetermined rate is, for example, from 1 to 10%, inclusive.

Pre-processing circuit 302b returns to Step S51 when the score change amount is larger than or equal to the predetermined value (NO in S53).

In Step S51 in this case, pre-processing circuit 302b selects the frame immediately before the previously selected frame, and combines a mask image with a combination frame. For example, when the frame previously selected is frame 43 of time t13 in FIG. 18, pre-processing circuit 302b selects frame 42 of time t12 immediately before, and generates mask image 45 for selected frame 42. In the next Step S52, pre-processing circuit 302b then combines mask image 45 with the combination frame stored in storage circuit 301. The combination frame generated previously is an image similar to mask image 46, and thus mask 46 is stored as a combination frame in storage circuit 301. Thus, pre-processing circuit 302b performs the combination, thereby generating a combination frame in which the area which is the union of the foreground in mask image 45 and the foreground in mask image 46 is represented by white pixels. Pre-processing circuit 302b performs the above processing on frame 41 at time 13 immediately before time t12 in the same manner. As a result, mask image 44 corresponding to frame 41 is further combined with a combination frame which becomes combination frame 47 based on three frames 41 to 43.

The processing in Steps S51 to S53 are repeated until a score change amount of a combination frame becomes smaller than the predetermined value.

Figure 19:
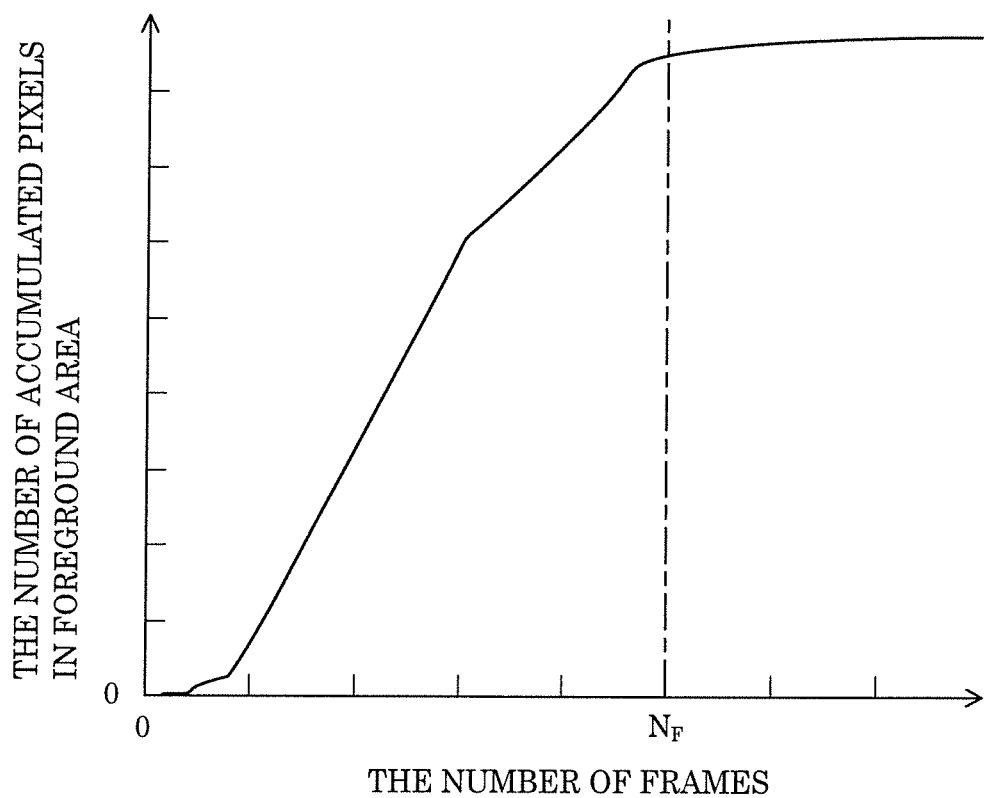
FIG. 19 is a graph illustrating change in the number of pixels in a foreground area in the case where foregrounds of a plurality of frames are combined.

Here, the change amount from the previous score is described with reference to FIG. 19. FIG. 19 is a graph illustrating change in the number of pixels in a foreground area in the case where foregrounds of a plurality of frames are combined. The vertical axis in the graph in FIG. 19 represents the numbers of accumulated pixels in the foreground areas, i.e. scores in combination frames, and the horizontal axis represents the number of frames combined in combination frames.

As illustrated in FIG. 19, the gradient in the graph is sharp up to the point corresponding to the number of frames $N_F$, but the gradient in the graph is dull after the point corresponding to the number of frames $N_F$. The score change amount from the previous score which is a determination target in Step S53 is equal to the gradient in FIG. 19. In other words, when a plurality of frames indicated in FIG. 19 are used, for example, Steps S51 to S53 are repeated until the number of frames $N_F$ is reached.

When the score change amount is smaller than the predetermined value (YES in S53), pre-processing circuit 302b determines all of a plurality of frames used to combine a combination frame and stored in storage circuit 301 to be a search frame set (S54).

Next, pre-processing circuit 302b adds, to frame sets to be processed, the frame having the largest score among the frames included in the search frame set (S55). It is to be noted that, at the stage before Step S55 is executed for the first time in calibration processing, the frame sets to be processed do not include any frame.

Pre-processing circuit 302b selects the frame that makes the score of a combination frame for evaluation to be the largest after the combination from the frames included in the search frame set assuming that the mask image corresponding to the combination frame for evaluation is combined with the combination frame (S56). More specifically, pre-processing circuit 302b calculates, for each of the frames included in the search frame set, a score of the combination frame for evaluation obtainable when assuming that the mask image generated from the frame with the combination frame for evaluation. In other words, pre-processing circuit 302b calculates the score by the number of frames included in the search frame set. Pre-processing circuit 302b then selects the frame having the largest score calculated from among the frames included in the search frame set.

It is to be noted that the combination frame for evaluation is stored in storage circuit 301 in the same manner as the combination frames. At the initial stage of the processing, that is, at the stage before Step S56 is executed for the first time in the calibration processing, for example, a combination frame for evaluation is a vacant frame in which each of pixels of the combination frame for evaluation does not have any pixel value.

Pre-processing circuit 302b combines the mask image generated from the selected frame with a combination frame for evaluation (S57). Pre-processing circuit 302b reads out the combination frame for evaluation stored in storage circuit 301, and combines the mask image generated from the frame selected in Step S56 with the read-out combination frame for evaluation. Pre-processing circuit 302b then stores the new combination frame for evaluation obtained as a result of the combination onto storage circuit 301. At this time, pre-processing circuit 302b may update the combination frame for evaluation stored in storage circuit 301 to a combination frame for evaluation newly obtained by the combination performed in Step S57.

It is to be noted that the combination in Steps S56 and S57 are the same as the combination performed in Step S52.

Pre-processing circuit 302b removes the frame selected in Step S56 from the search frame set, and adds the frame to the frame sets to be processed (S58). Pre-processing circuit 302b stores, onto storage circuit 301, the search frame set after the removal and frame sets to be processed after the addition.

Pre-processing circuit 302b determines whether a specified number of frames have been selected (S59). In other words, pre-processing circuit 302b determines whether the number of frames added to the frame sets to be processed is equal to the specified number. The specified number is 4, for example.

Pre-processing circuit 302b returns to Step S56 when the number of frames added to the frame sets to be processed is smaller than the specified number (NO in S59). In Step S56 at this time, a frame is selected from frames included in a plurality of frames included in search frame set stored in storage circuit 301 after Step S58.

When the number of frames added to the frame sets to be processed reaches the specified number (YES in S59), pre-processing circuit 302b outputs the frame sets to be processed stored in storage circuit 301 as the frame sets which have been previously selected (S60).

Hereinafter, the frame pre-selecting processing in the first example ends.

Referring back to FIG. 16, pre-processing circuit 302b selects a frame set to be processed from among the plurality of frame sets which have been selected in advance in Step S42a (S42b). Pre-processing circuit 302b selects, for example, a frame set of a predetermined time.

Subsequently, the selected frame set to be processed is subjected to the processing similar to the processing in Steps S43 to S45 in the calibration processing according to Embodiment 1.

Subsequently, matching circuit 302d determines whether Steps S43 to S45 have been performed on all of the frame sets selected in advance (S46a). When it is determined that processing in Steps S43 to S45 for all of the frame sets selected in advance has not yet been performed (NO in S46a), processing in Steps S42b, and S43 to S45 is performed on a frame set which has not yet been subjected to the processing in Steps S43 to S45 among the frame sets selected in advance. When it is determined that processing in Steps S43 to S45 for all of the frame sets selected in advance has been performed (NO in S46a), advance is made to next Steps 47 and 48.

It is to be noted that the following steps S47 and S48 are similar to Steps S47 and S48 in the calibration processing according to Embodiment 1, and thus are not described here.

In this way, in the calibration processing according to Variation 3, frame sets are selected in advance in Step S42a, and thus it is possible to select, in advance, the frame sets that yield a sufficient number of matching results. For this reason, in this calibration processing, no feature point matching is performed on frame sets other than the frame sets selected in advance. Thus, it is possible to reduce increase in processing load due to unsuccessful obtainment of a sufficient number of matching results and reduce increase in processing time.

It is to be noted that the frame pre-selecting processing is not limited to the processing described in the first example in FIG. 17. For example, in the first example, in Step S59, the greedy method may be used to calculate a combination that maximizes the foreground area in each of a specified number of frame sets by determining the upper limit value of the number of frame sets to be added to frame sets to be processed to be a fixed value as a specified number, and the frame sets are selected. However, this is a non-limiting example. For example, it is also excellent to use the greedy method to calculate the combination that minimizes the number of frame sets among a plurality of frame sets that yield a predetermined rate (for example, 30%) or more as the rate of the union of the foreground areas in imaging areas in frame sets, and to select the frame sets.

Figure 20:
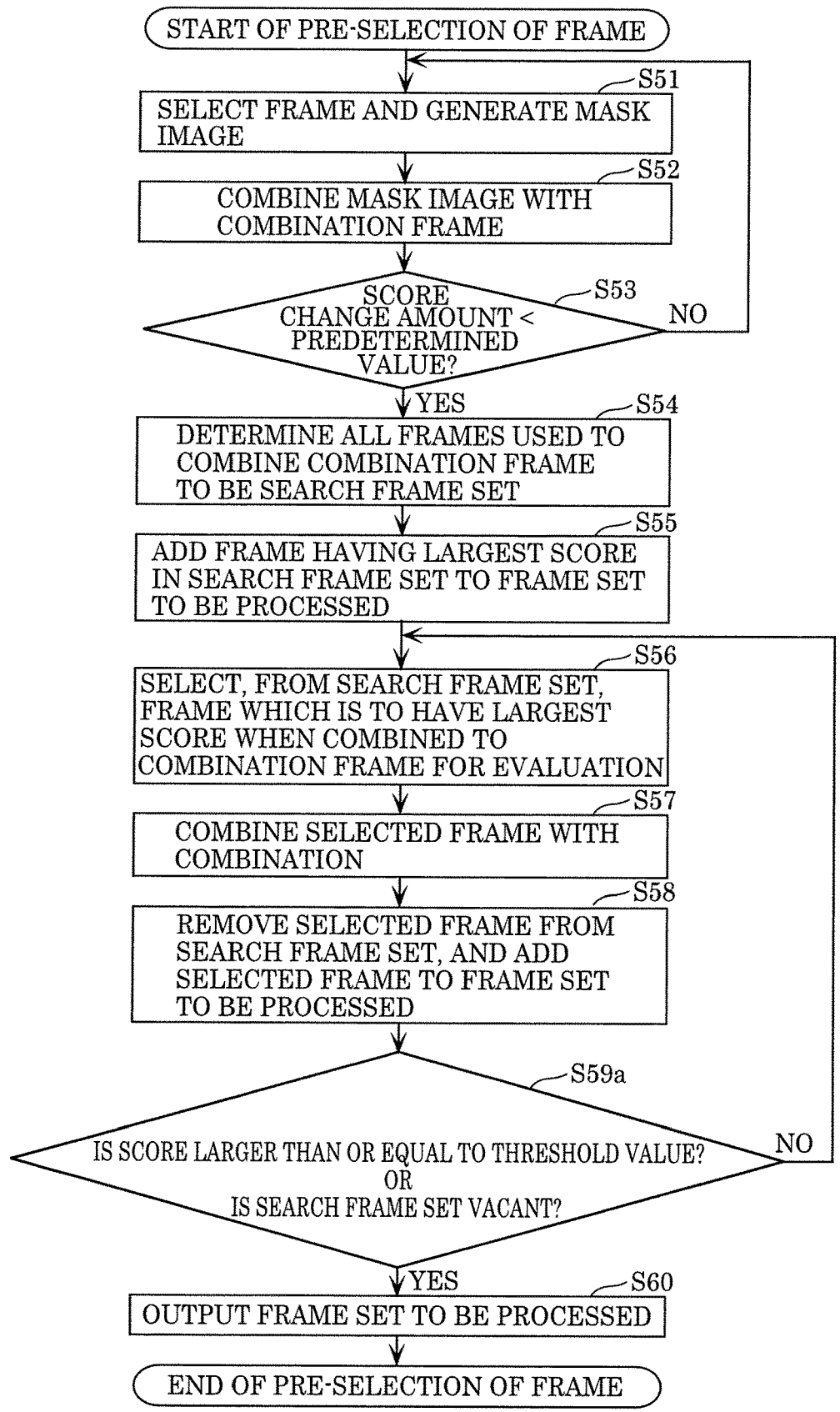
FIG. 20 is a flow chart illustrating a second example of frame pre-selecting processing.

Frame pre-selecting processing in this case is described with reference to FIG. 20. FIG. 20 is a flow chart illustrating a second example of frame pre-selecting processing.

The second example of the frame pre-selecting processing is different in that Step S59a is performed instead of Step S59 in the first example. In other words, in the second example, Steps S51 to S58 similar to those in the first example are performed.

After Step S58, pre-processing circuit 302b determines whether (i) a score of a combination frame for evaluation stored in storage circuit 301 is larger than or equal to a predetermined threshold value, or (ii) a search frame set is vacant (S59a). It is to be noted that a state in which a search frame set is vacant is a state in which the number of frames included in the search frame set is reduced to 0 by repeating Step S58.

Pre-processing circuit 302b returns to Step S56 when the score of the combination frame for evaluation is smaller than the threshold value and the search frame set is not vacant (NO in S59a). In Step S56 at this time, a frame is selected from frames included in the search frame set stored in storage circuit 301 after Step S58.

When the score of the combination frame for evaluation is larger than or equal to the threshold value and the search frame set is vacant (YES in S59a), pre-processing circuit 302b outputs the frame set to be processed stored in storage circuit 301 as the frame sets selected in advance (S60).

Hereinafter, the frame pre-selecting processing in the second example ends.

It is to be noted that the frame pre-selecting processing is not limited to the processing described in the first example in FIG. 17 and the processing described in the second example in FIG. 20. For example, it is also excellent to select a frame set for multi-purpose optimization that further decreases the number of frame sets to be selected in advance and increases the rate of the union of the foreground areas in image areas in frame sets. In this case, for example, the greedy method is used to obtain the set that maximizes $1/(N+1)+f/I$ when the number of frame sets to be selected in advance is N (N is a natural number larger than 1), the size of the foreground area is f, and the size of an imaging area of a frame is I, and the frame set is selected. It is to be noted that each of the size f of the foreground area and size I of the imaging area may be represented as the number of pixels of the corresponding one of the foreground area and the imaging area.

Figure 21:
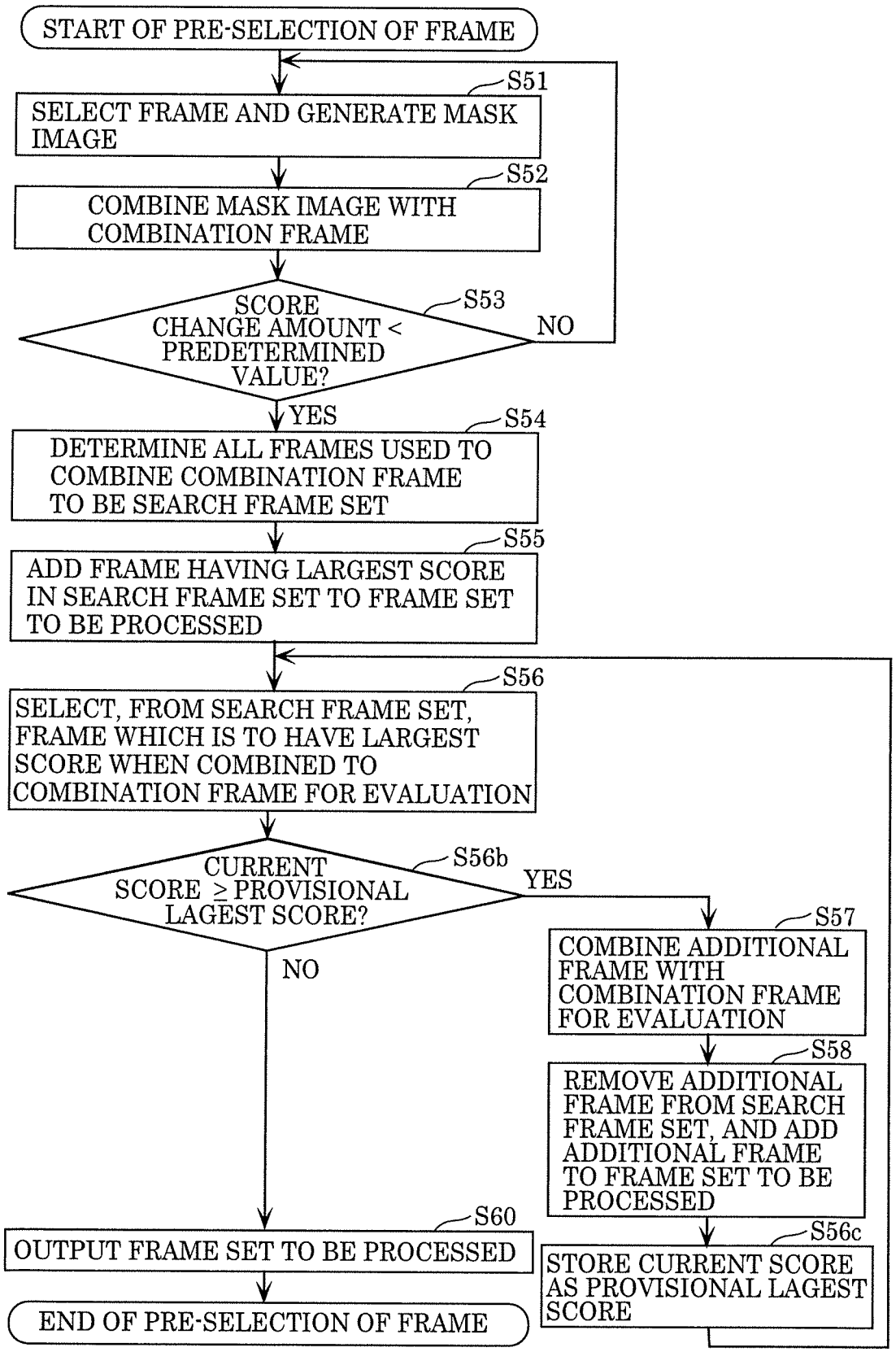
FIG. 21 is a flow chart illustrating a third example of frame pre-selecting processing.

Frame pre-selecting processing in this case is described with reference to FIG. 21. FIG. 21 is a flow chart illustrating a third example of frame pre-selecting processing.

The third example of the frame pre-selecting processing is different in that Steps S56b, S57, S58, and S56c are executed instead of Steps S57 to S59 in the first example. In other words, in the third example, Steps S51 to S56 similar to those in the first example are performed.

After Step S56, pre-processing circuit 302b determines whether a current score which is the largest score among scores calculated in Step S56 is larger than or equal to a provisional largest score stored in storage circuit 301 (S56b). It is to be noted that the provisional largest score stored in storage circuit 301 is 0 for example at a stage before Step S56b is executed for the first time in calibration processing.

When the current score is larger than or equal to the provisional largest score (YES in S56b), pre-processing circuit 302b executes Steps S57 and S58, and further stores the current score in storage circuit 301 as a new provisional largest score (S56c). At this time, pre-processing circuit 302b may update the provisional largest score stored in storage circuit 301 to the current score.

When Step S56c ends, a return is made to Step S56. In Step S56 at this time, a frame is selected from frames included in search frame set stored in storage circuit 301 after Step S58.

When the current score is smaller than the provisional largest score (NO in S56b), pre-processing circuit 302b outputs the frame set to be processed stored in storage circuit 301 as the plurality of frame sets previously selected (S60).

This is the end of the frame pre-selecting processing in the third example.

Embodiment 2

Other application examples of the configurations of the image processing method and apparatus described in each embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

Figure 22:
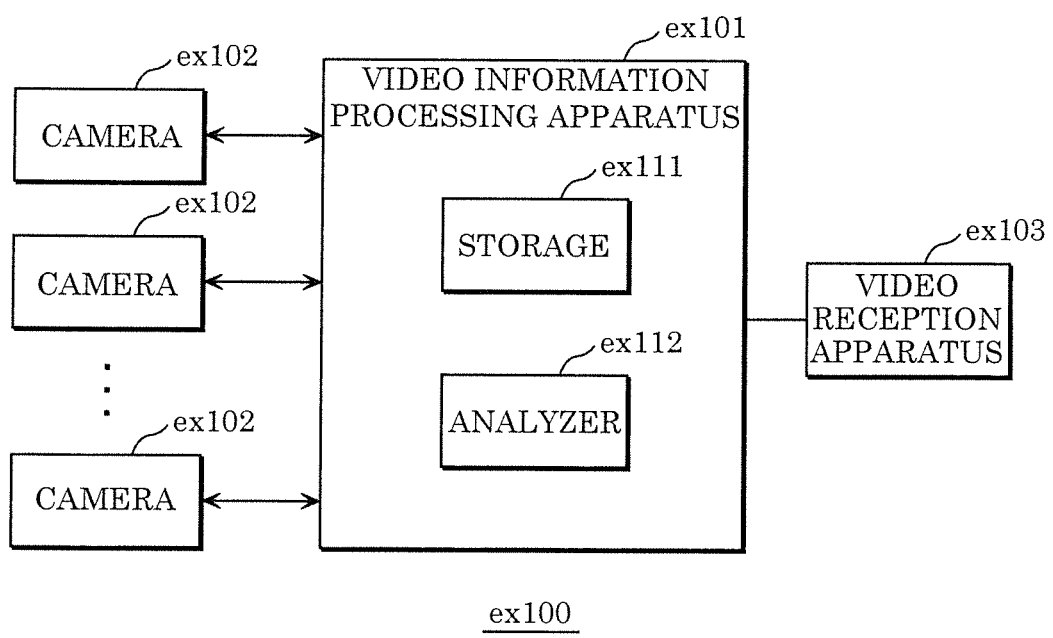
FIG. 22 illustrates a configuration of a video information processing system.

FIG. 22 is a diagram illustrating a configuration of video information processing system ex100 according to the present embodiment. The present embodiment describes an example of preventing occurrence of a blind spot and an example of prohibiting capturing of a specific area.

Video information processing system ex100 illustrated in FIG. 22 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a blind spot from the video data stored in storage ex111, and transmits to the moving camera the instruction signal that indicates an instruction to the moving camera for preventing occurrence of a blind spot. The moving camera moves in response to the instruction signal, and continues capturing.

Analyzer ex112 detects a blind spot by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a blind spot an area that cannot be restored.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a blind spot is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a blind spot by using any method that enables detection of the imaging area of each camera. Moreover, analyzer ex112 may acquire, for example, information of a mutual positional relationship between a plurality of objects to be captured, from video data or a proximity sensor, and analyzer ex112 may identify an area where a blind spot is highly likely to occur, based on the acquired positional relationship.

Here, the blind spot includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a blind spot even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a blind spot may be determined.

Note that detection of the area that is actually a blind spot is described above, but the area that needs to be detected in order to prevent occurrence of a blind spot is not limited to the area that is actually a blind spot. For example, when a plurality of objects to be captured exists and at least part of the objects is moving, a new blind spot is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new blind spot, based on the detected movement of the plurality of objects to be captured and positional information of camera ex102. In this case, video information processing apparatus ex101 may transmit the instruction signal to the moving camera to capture the area that is likely to become a blind spot, and video information processing apparatus ex101 may prevent occurrence of a blind spot.

Note that when there is a plurality of moving cameras, video information processing apparatus ex101 needs to select any of the moving cameras to which the instruction signal is to be transmitted in order to cause the moving camera to capture a blind spot or an area that is likely to become a blind spot. Moreover, when there is a plurality of moving cameras and there is a plurality of blind spots or areas that are likely to become blind spots, video information processing apparatus ex101 needs to determine which blind spot or area that is likely to become a blind spot each of the plurality of moving cameras is to capture. For example, video information processing apparatus ex101 selects the moving camera closest to a blind spot or an area that is likely to become a blind spot, based on a position of a blind spot or an area that is likely to become a blind spot, and a position of an area each moving camera is capturing. Moreover, video information processing apparatus ex101 may determine for each camera whether a new blind spot occurs when video data which the moving camera is currently capturing is not obtained, and video information processing apparatus ex101 may select the moving camera that is determined that a blind spot does not occur even when the video data which is currently being captured is not obtained.

The above-described configuration enables video information processing apparatus ex101 to prevent occurrence of a blind spot by detecting a blind spot and transmitting the instruction signal to the moving camera so as to prevent the blind spot.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the imaging area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image. Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current imaging area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing. Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 6

Analyzer ex112 may determine which area in the facility or in the stadium the user camera is capturing, by matching the free viewpoint video with the video captured by the user camera. Note that the method for determining the imaging area is not limited thereto, but various methods for determining the imaging area described in each of the above-described embodiments or other methods for determining the imaging area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching. Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. In particular, in the case of distributing during the game, video information processing apparatus ex101 may distribute a scene which the user has missed and which is considered to be important, based on the analysis result made by analyzer ex112. Moreover, video information processing apparatus ex101 may distribute the past video when there is a user request, or may distribute a message of distribution permission prior to distribution of the past video.

Variation 7

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 6. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge when the user views the advertisement, or may provide services at a lower cost than a cost in the case where the user does not view the advertisement.

Moreover, when the user clicks "Order now" or the like in response to the advertisement, a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 8

Video reception apparatus ex103 may be one of the cameras ex102 (user cameras). In this case, analyzer ex112 matches the free viewpoint video with the video captured by the user camera, and accordingly analyzer ex112 determines which area in the facility or in the stadium the user camera is capturing. Note that the method for determining the imaging area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area shifted by the amount indicated by the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video from the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, he user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the imaging area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.

Variation 9

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a blind spot, some area of the imaging areas in the captured video data is likely to be needed for filling the blind spot. In this case, camera ex102 may generate extracted video data by extracting at least the area needed for preventing occurrence of the blind spot from the video data, and transmit the generated extracted video data to video information processing apparatus ex101. This configuration can realize suppression of occurrence of the blind spot at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit the positional information and information of the capturing direction detected by camera ex102. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the imaging area from more cameras ex102, video information processing apparatus ex101 is effective, for example, for using information of the imaging area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.

Variation 10

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present embodiment is effective.

Variation 11

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the external appearance video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.

Variation 12

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may restore the three-dimensional shapes of persons and moving objects or preferentially restore the three-dimensional shapes of persons and moving objects.

Variation 13

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex111. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using high-quality data, or by preferentially using high-quality data among the plurality of pieces of video data stored in storage ex111.

Variation 14

Analyzer ex112 may restore the three-dimensional shape by using camera attribute information. For example, analyzer ex112 may generate the three-dimensional shape video by a method such as a volume intersection technique or a multi-view stereo method by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Figure 23:
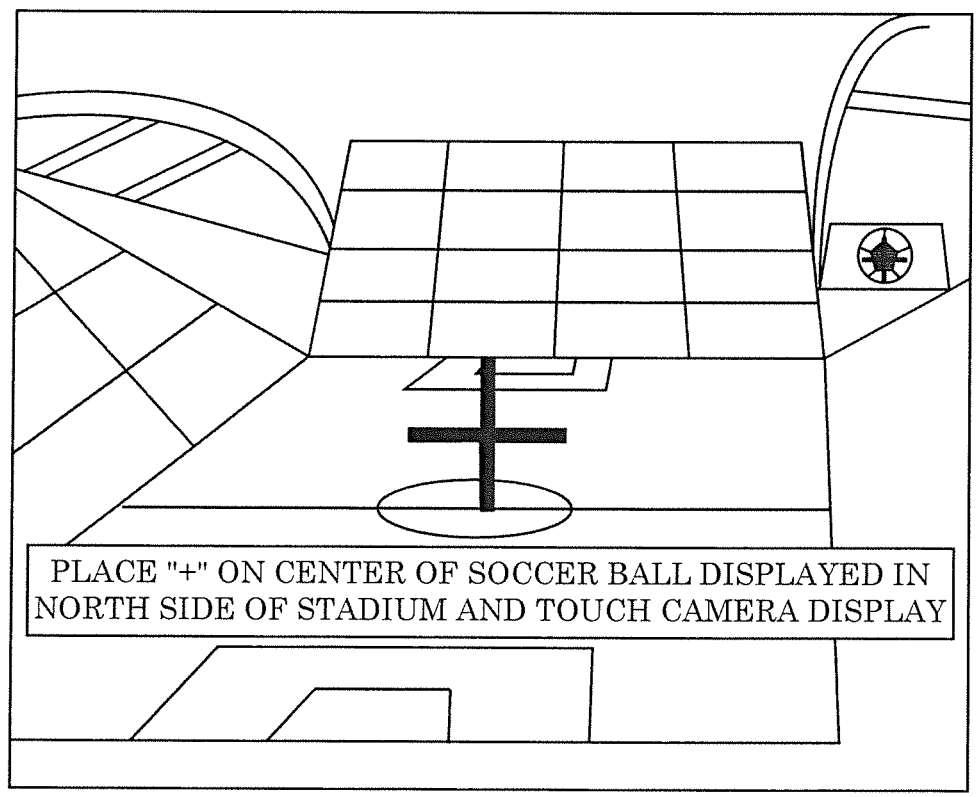
FIG. 23 illustrates one example of a notification screen displayed when a camera is activated.

Moreover, the positional and angle information of camera ex102 is acquired by pointing camera ex102 at a specific point in the facility or in the stadium when camera ex102 is activated or at any timing. FIG. 23 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the imaging area during a capturing period by using an arrow or the like may be used.

The coordinates of camera ex102 may be identified by using a radio wave of the global positioning system (GPS), wireless fidelity (Wi-Fi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 15

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 16

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by simultaneously using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera, weather and a road surface state in a direction of a destination, traffic congestion level and the like can be understood with better accuracy by using three-dimensional data modeled from a plurality of images.

Variation 17

The above-described system may also be applied to a system that performs distance measurement or modeling of a building or equipment by using a plurality of cameras, for example.

Here, for example, in a case of capturing an image of a building from above using one drone, and performing distance measurement or modeling of the building, there is a problem in that an image of an animal may be captured by the camera during distance measurement, thereby reducing the accuracy of distance measurement. There is also a problem in that distance measurement and modeling cannot be performed with respect to an animal.

Meanwhile, by using a plurality of cameras (fixed cameras, smartphones, wearable cameras, drones, etc.) as described above, distance measurement and modeling of a building may be performed with stable accuracy regardless of presence or absence of an animal. Also, distance measurement and modeling may be performed with respect to an animal.

Specifically, for example, at a construction site, a camera is attached to a helmet or the like of a worker. This allows distance measurement of the building to be performed in parallel to the work of the worker. Also, efficiency of work may be increased, and mistakes may be prevented. Furthermore, modeling of the building may be performed by using a video captured by the camera worn by the worker. Moreover, a manager at a remote location may check the progress by looking at a modeled building.

Moreover, this system may be used for inspection of equipment that cannot be stopped, such as a machine at a factory or a power station. Also, this system can be used to inspect opening/closing of a bridge or a dam, or to inspect an abnormality in the operation of a ride in an amusement park, for example.

Moreover, by monitoring the level of traffic jam or the amount of traffic on a road by this system, a map indicating the level of traffic jam or the amount of traffic on the road in each time zone may be created.

Embodiment 3

The processing described in each of the above-described embodiments can be carried out easily in a standalone computer system by recording a program for implementing the configuration of the image processing method described in each embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the embodiments and the systems using the application examples will be further described. The systems include an apparatus that uses the image processing method. A change in other configurations of the systems can be made appropriately in accordance with the circumstances.

Figure 24:
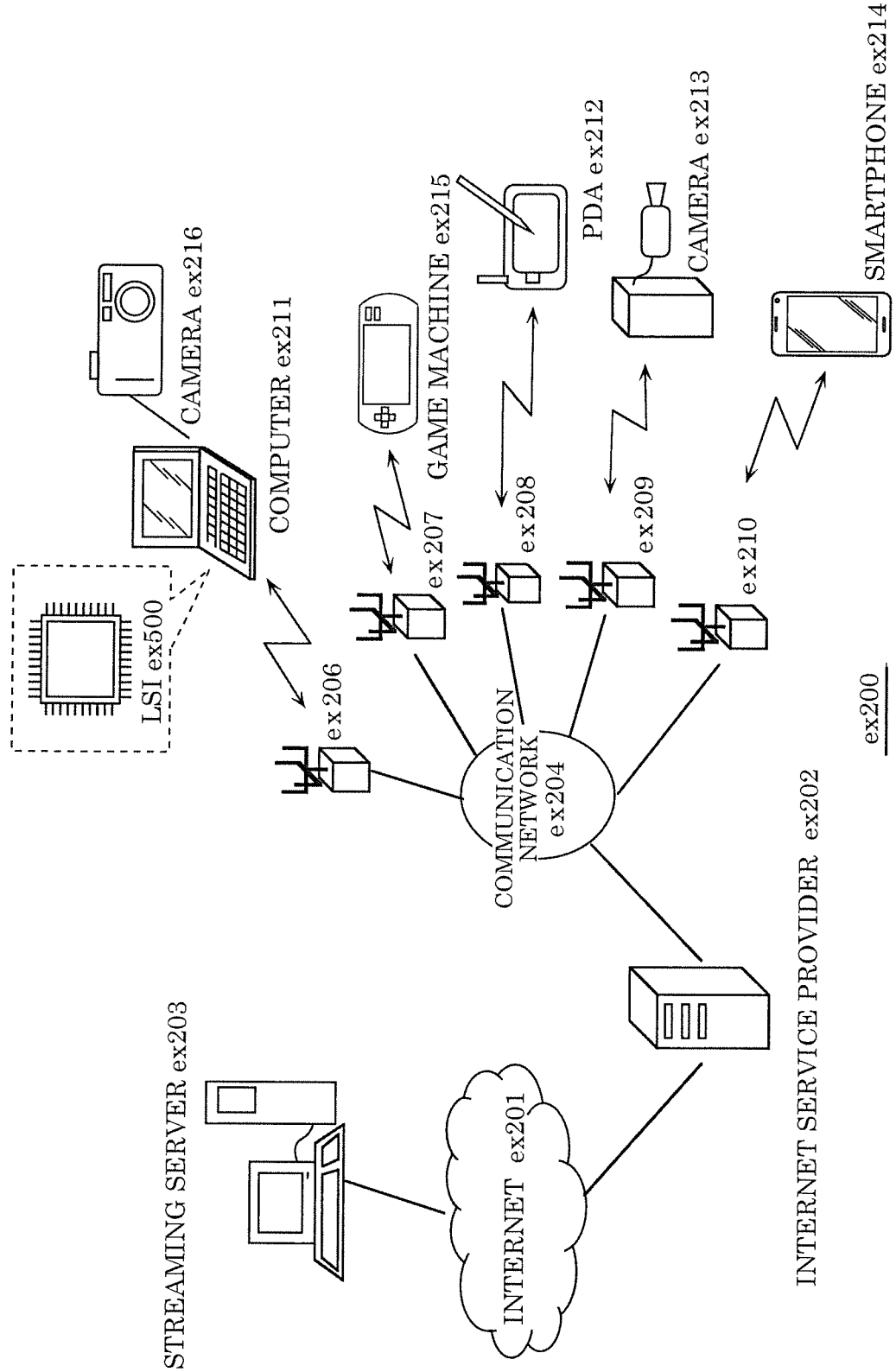
FIG. 24 illustrates an overall configuration of a content providing system that implements content distribution services.

FIG. 24 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 24, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communication (GSM) (registered trademark) scheme, a code division multiple access (CDMA) scheme, a wideband-code division multiple access (W-CDMA) scheme, an long term evolution (LTE) scheme, an high speed packet access (HSPA) scheme, or a communication scheme using high-frequency bands, or a personal handy-phone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may include a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 25:
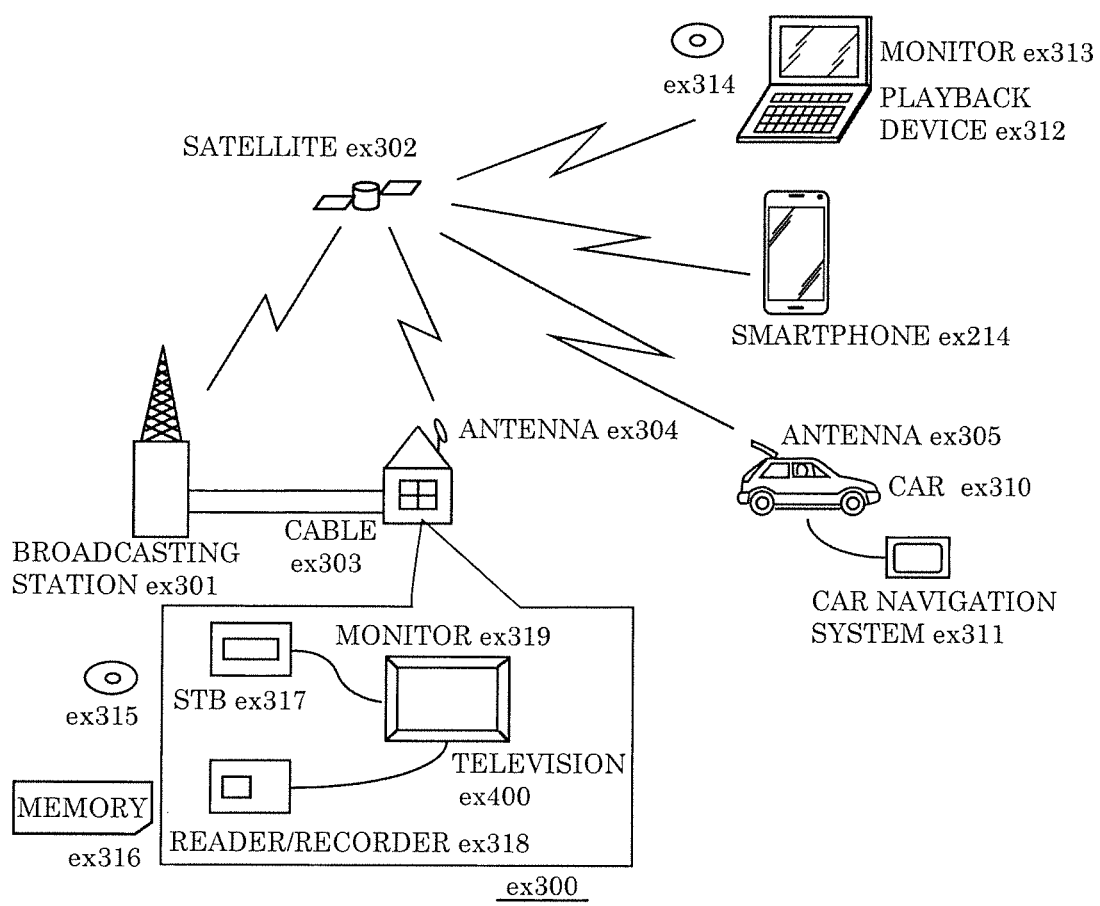
FIG. 25 illustrates an overall configuration of a digital broadcasting system.

Note that in addition to the example of content providing system ex200, each of the above-described embodiments may also be applied to digital broadcasting system ex300, as illustrated in FIG. 25. Specifically, broadcasting station ex301 transmits multiplexed data obtained by multiplexing video data with music data or the like via a radio wave to communication or satellite ex302. This video data is data coded by the moving image coding method described in each of the above-described embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 26:
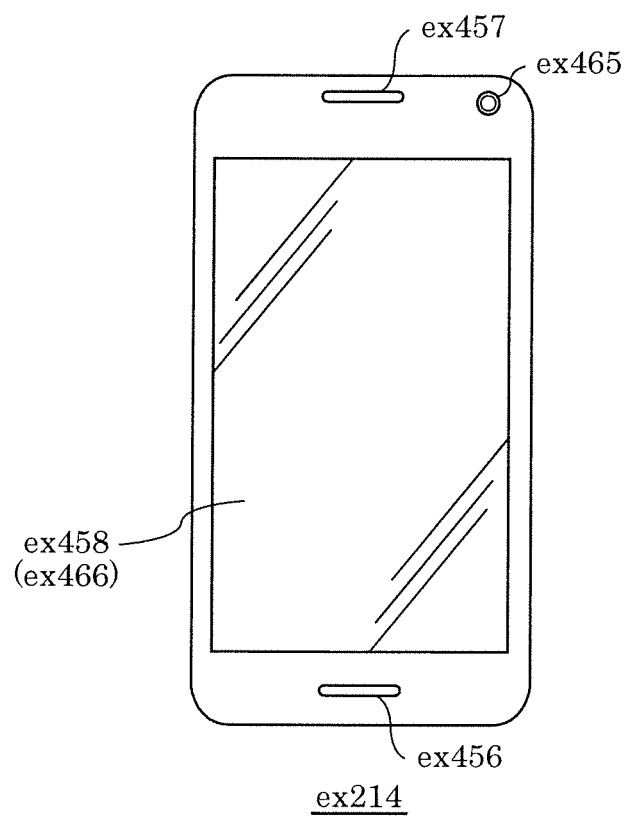
FIG. 26 illustrates one example of a smartphone.
Figure 27:
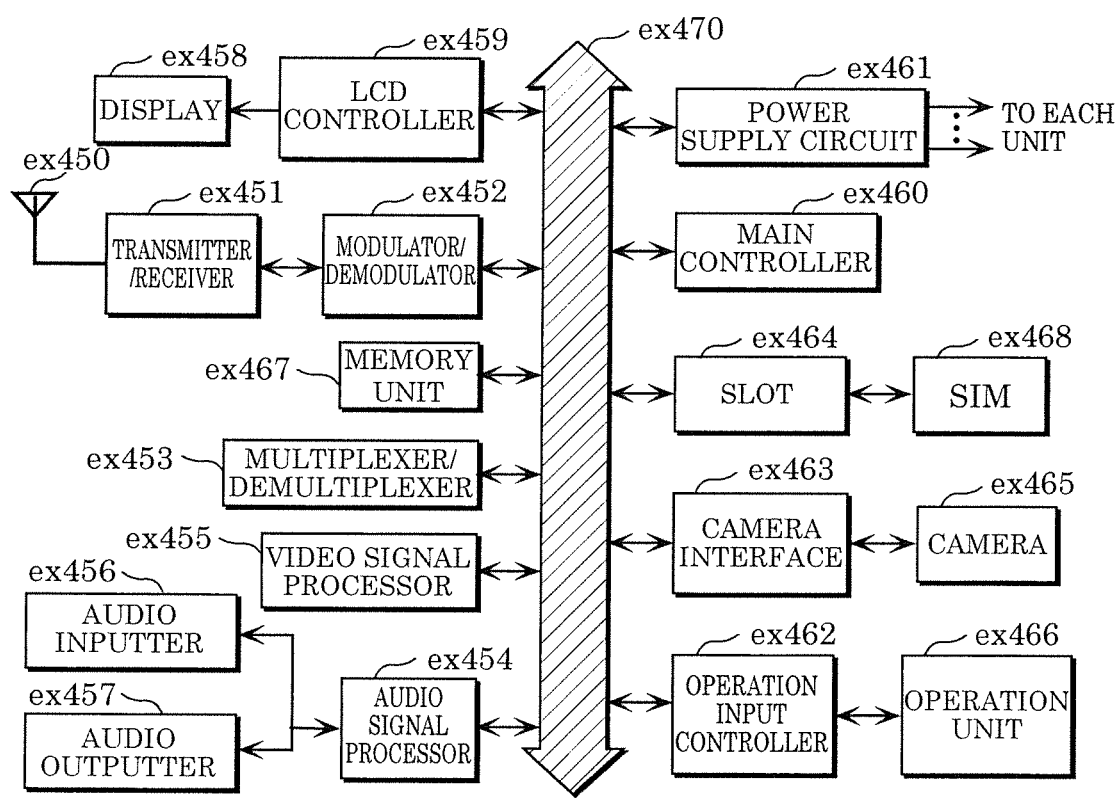
FIG. 27 is a block diagram illustrating an example of a configuration of a smartphone.

FIG. 26 is a diagram illustrating smartphone ex214. Moreover, FIG. 27 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 25, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214, amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including an encoder, and a reception terminal including a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data. The present disclosure is not limited to such embodiments described above, and various variations and modifications may be made without departing from the scope of the present disclosure.

Note that in the above embodiments, each of the elements may be constituted by dedicated hardware, or may be implemented by executing a software program suitable for the element. Each element may be achieved by a program executor such as a CPU or a processor reading and executing a software program recorded on a recording medium such as a hard disk or semiconductor memory. Here, the software that achieves, for instance, the imaging system according to the above embodiments is a program as below.

Specifically, this program is for causing a computer to execute a calibration method by a calibration apparatus which calibrates parameters of a plurality of imaging apparatuses which are disposed at different positions and image a common three-dimensional space. The calibration method includes: obtaining a plurality of videos including a plurality of frames, the plurality of videos having been captured by the plurality of imaging apparatuses; extracting a plurality of first feature points from first frames included in the plurality of videos obtained in the obtaining; extracting a plurality of second feature points from areas containing an image of a moving object in second frames included in the plurality of videos obtained in the obtaining, the second frames being different from the first frames; performing matching between the plurality of first feature points extracted in the extracting of the plurality of first feature points; performing matching between the plurality of second feature points extracted in the extracting of the plurality of second feature points; and calculating parameters of the plurality of imaging apparatuses based on a plurality of matching results obtained in the matching between the plurality of first feature points and the matching between the plurality of second feature points.

The above has given a description of the imaging system and the calibration method according to one or more aspects of the present disclosure, based on the embodiments, yet the present disclosure is not limited to these embodiments. Various modifications to the embodiments that may be conceived by those skilled in the art and combinations of elements in different embodiments may be included within the scope of the one or more aspects of the present disclosure, as long as the modifications and the combinations do not depart from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable as calibration apparatuses, etc. which easily calibrate parameters of a plurality of imaging apparatuses disposed at positions different from one another.

What is claimed is:

1. A calibration apparatus which calibrates parameters of a plurality of imaging apparatuses which are disposed at different positions and image a common three-dimensional space, the calibration apparatus comprising:
an obtaining circuit which obtains a plurality of videos captured by the plurality of imaging apparatuses and each including a plurality of frames;
an extraction circuit which extracts a plurality of feature points from the plurality of frames included in the plurality of videos obtained by the obtaining circuit, the plurality of feature points including a plurality of first feature points extracted from first frames included in the plurality of videos and a plurality of second feature points extracted from areas containing an image of a moving object in second frames included in the plurality of videos, the second frames being different from the first frames;
a matching circuit which performs matching using the plurality of feature points extracted by the extraction circuit, the matching including matching between the plurality of first feature points and matching between the plurality of second feature points; and
a calibration circuit which calculates parameters of the plurality of imaging apparatuses based on a plurality of first matching results obtained through the matching by the matching circuit.

2. The calibration apparatus according to claim 1, wherein the extraction circuit:
extracts, as the second frames, frames captured at a first timing in the plurality of videos and including the areas containing the image of the moving object; and
extracts the plurality of second feature points in the second frames extracted from the plurality of videos.

3. The calibration apparatus according to claim 2, wherein when a total number of first matching results is smaller than a first number,
the extraction circuit extracts a plurality of third feature points from areas containing an image of the moving object in third frames included in the plurality of videos, the third frames being captured at a second timing different from the first timing,
the matching circuit performs matching between the plurality of third feature points extracted by the extraction circuit, and
the calibration circuit calculates parameters of the plurality of imaging apparatuses based on a plurality of second matching results including the plurality of first matching results and results of the matching between the plurality of third feature points.

4. The calibration apparatus according to claim 3, wherein the extraction circuit and the matching circuit repeat the extracting and the matching on frames captured at a timing different from a capturing timing of frames on which the extraction has been performed in the plurality of videos, until a total number of second matching results obtained through the matching by the matching circuit reaches or exceeds the first number.

5. The calibration apparatus according to claim 1, wherein in a case where areas obtained by dividing each of the plurality of videos include insufficient areas in each of which a total number of feature points is smaller than a second number among the plurality of feature points associated in the plurality of first matching results,
the extraction circuit extracts fourth frames including the insufficient areas containing an image of the moving object in the plurality of videos, and extracts a plurality of fourth feature points from the insufficient areas of the fourth frames, the matching circuit performs matching between the plurality of fourth feature points extracted by the extraction circuit, and the calibration circuit calculates parameters of the plurality of imaging apparatuses based on a plurality of third matching results including the plurality of first matching results and results of the matching between the plurality of fourth feature points.

6. The calibration apparatus according to claim 5, wherein the extraction circuit and the matching circuit repeat the extracting and the matching on frames captured at a timing different from a capturing timing of frames on which the extraction has been performed in the plurality of videos, until a total number of third matching results obtained through the matching by the matching circuit in the areas reaches or exceeds the second number.

7. The calibration apparatus according to claim 1, wherein the calibration circuit further estimates a plurality of three-dimensional positions on the three-dimensional space included in the plurality of first matching results, the calibration apparatus further comprising:

a determination circuit which determines whether accuracy of the parameters calibrated by the calibration apparatus is sufficient based on the plurality of three-dimensional positions estimated by the calibration circuit, wherein when the determination circuit determines that the accuracy of the parameters is not sufficient, the extraction circuit, the matching circuit, the calibration circuit, and the determination circuit repeat the extracting, the matching, the calibrating, the estimating, and the determining respectively on frames captured at a timing different from a capturing timing of frames on which the extracting has been performed in the plurality of videos, until the determination circuit determines that the accuracy of the parameters is sufficient.

8. The calibration apparatus according to claim 7, wherein the determination circuit determines whether each of errors is smaller than a predetermined value, the error being an error between (i) one of sets of two-dimensional coordinates in two-dimensional images obtainable when the plurality of imaging apparatuses image three-dimensional positions included in the plurality of three-dimensional positions estimated by the calibration circuit and (ii) a corresponding set of two-dimensional coordinates included in sets of two-dimensional coordinates, the sets of two-dimensional coordinates being a set of two-dimensional coordinates of one of the plurality of first feature points and a set of two-dimensional coordinates of one of the plurality of second feature points, the plurality of first feature points and the plurality of second feature points being obtained from the plurality of videos captured by the plurality of imaging apparatuses, and when the determination circuit determines that the error is larger than the predetermined value, the extraction circuit, the matching circuit, the calibration circuit, and the determination circuit repeat the extracting, the matching, the calibrating, the estimating, and the determining respectively on a plurality of frames captured at a timing different from a capturing timing of frames on which the extracting has been performed in the plurality of videos, until an error between (i) one of the sets of two-dimensional coordinates and (ii) one of the sets of two-dimensional coordinates is determined to be smaller than or equal to the predetermined value by the determination circuit.

9. A calibration method performed by a calibration apparatus which calibrates parameters of a plurality of imaging apparatuses which are disposed at different positions and image a common three-dimensional space, the calibration method comprising:

obtaining a plurality of videos including a plurality of frames, the plurality of videos having been captured by the plurality of imaging apparatuses;

extracting a plurality of first feature points from first frames included in the plurality of videos obtained in the obtaining;

extracting a plurality of second feature points from areas containing an image of a moving object in second frames included in the plurality of videos obtained in the obtaining, the second frames being different from the first frames;

performing matching between the plurality of first feature points extracted in the extracting of the plurality of first feature points;

performing matching between the plurality of second feature points extracted in the extracting of the plurality of second feature points; and calculating parameters of the plurality of imaging apparatuses based on a plurality of matching results obtained in the matching between the plurality of first feature points and the matching between the plurality of second feature points.

* * * * *